United States Patent [19]
Klein

[11] Patent Number: 6,035,295
[45] Date of Patent: Mar. 7, 2000

[54] COMPUTER SYSTEM AND METHOD OF DATA ANALYSIS

[76] Inventor: Laurence C. Klein, 732 Symphony Woods Dr., Silver Spring, Md. 20901

[21] Appl. No.: 09/198,442

[22] Filed: Nov. 24, 1998

Related U.S. Application Data

[63] Continuation of application No. 08/780,666, Jan. 7, 1997, Pat. No. 5,845,285.

[51] Int. Cl.[7] ................................................. G06F 17/30
[52] U.S. Cl. ........................ 707/6; 707/2; 707/5; 707/7; 707/10; 707/101; 707/204; 707/205; 707/206
[58] Field of Search .................................. 707/1, 2, 5, 6, 707/7, 10, 101, 204, 205, 206, 508; 704/2; 455/410; 382/144, 145, 149, 321; 347/225, 260; 84/609; 342/457

[56] References Cited

U.S. PATENT DOCUMENTS

| | | | |
|---|---|---|---|
| 4,933,848 | 6/1990 | Haderle et al. | 364/300 |
| 5,058,113 | 10/1991 | Burnham et al. | 371/15.1 |
| 5,146,541 | 9/1992 | Speidel | 395/21 |
| 5,163,131 | 11/1992 | Row et al. | 395/200 |
| 5,175,800 | 12/1992 | Galis et al. | 395/51 |
| 5,222,236 | 6/1993 | Potash et al. | 395/600 |
| 5,245,672 | 9/1993 | Wilson et al. | 382/9 |
| 5,263,107 | 11/1993 | Ueda et al. | 382/14 |
| 5,301,257 | 4/1994 | Tani | 395/11 |
| 5,303,330 | 4/1994 | Gersho et al. | 395/24 |
| 5,325,510 | 6/1994 | Frazier | 395/425 |
| 5,404,509 | 4/1995 | Klein | 395/600 |
| 5,412,801 | 5/1995 | De Remer et al. | 714/20 |
| 5,446,575 | 8/1995 | Lysakowski | 707/104 |
| 5,515,477 | 5/1996 | Sutherland | 395/27 |
| 5,592,661 | 1/1997 | Eisenberg | 707/104 |
| 5,832,525 | 11/1998 | Wong et al. | 707/205 |
| 5,845,143 | 12/1998 | Yamauchi et al. | 704/2 |
| 5,864,848 | 1/1999 | Horvitz et al. | 707/6 |

OTHER PUBLICATIONS

Svanks, M.I., "Integrity analysis: methods for automating data quality assurance", *Information and Software Technology*, vol. 30, No. 10, pp. 595–605, Dec., 1988.

Svanks, M.I., *Integrity Analysis: A Methodology for EDP Audit and Data Quality Control*, Ph.D. Dissertation, University of Toronto, 1981, pp. 1–125.

Svanks, M.I., "How reliable is your data", *Canadian Datasystems*, vol. 20, No. 4, pp. 80–81, Apr. 1988.

Svanks, M.I., "Pitfalls in the use of retrieval software", *EPDACS*, vol. 10, No. 6, pl–8, Dec., 1982.

FIPS PUB 88, *Guideline On Integrity Assurance And Control In Database Administration*, US Department of Commerce, National Bureau of Standards, Aug. 14, 1981.

(List continued on next page.)

*Primary Examiner*—Thomas G. Black
*Assistant Examiner*—Diane Mizrahi
*Attorney, Agent, or Firm*—Irah H. Donner; Pepper Hamilton LLP

[57] ABSTRACT

A neural network based data comparison system compares data stored within a database against each other to determine duplicative, fraudulent, defective and/or irregular data. The system includes a database storing data therein, and a pattern database storing pattern data therein. The system further includes a data pattern build system, responsively connected to the database and to the pattern database. The data pattern build system retrieves the data from the database and generates the pattern data formatted in accordance a predetermined patten. The predetermined pattern includes an array having array locations corresponding to each character in a defined character set. The data pattern build system increments a value in each of the array locations responsive to the number of occurrences of each character in the data and stores the array as the pattern data in the pattern database. The comparison system also includes a neural network, responsively connected to the pattern database, which retrieves the pattern data stored therein and compares the pattern data to each other and determines responsive to the comparing when different pattern data match in accordance with predetermined criteria indicating that the different pattern data are duplicative, fraudulent, defective and/or irregular.

16 Claims, 24 Drawing Sheets

OTHER PUBLICATIONS

Liskin, Miriam, "Can You Trust Your Database?", *Personal Computing,* vol. 14, No. 6, Jun. 26, 1990, pp. 129–134.

*Microsoft Works Version 1.05 Users Guide,* (1988), p.i–xv, 229–269, 337–374, 433–483, 537–548.

Oracle Announces Enhancements to Oracle Office and Microsoft MAPI Support, p. 1, http://www.uk.oracle.com/info/news/proffen.html (May 1995).

Oracle Unveils Communication Architecture and Aggressive Enterprise Communications Strategy, pp. 1–2, http://www.oracle.com/corporate/press/html/commonarchit.html. (May 1995).

Oracle Delivers Front–Office Suite For Network Computers and Other Java–Enabled Thin Clients, pp. 1–2 http://www.oracle.com/corporate/press/html/commonarchit.html (May 1995).

Oracle Course Description, Using Oracle Office V2.1 (CBT), p. 1 http://education.oracle.com/desc/40301.html (Jan. 1997).

FIG. 12

| DATABASE FILE | C:/DATABASE4/CIGNA/DOCS.DBF | | | | | |
|---|---|---|---|---|---|---|
| AUDIT DESCRIPTION | | | | | | |
| AUDIT DATE | 05/07/92 | | | | | |
| AUDIT ACCURACY | 99.1 | | | | | |
| RECORDS TO AUDIT | 162 | | | | | |

| FIELD NAME | GROUP NAME | TOTAL SAMPLE | EMPTY FIELDS | FILLED FIELDS | ERRORS | ACCURACY |
|---|---|---|---|---|---|---|
| DOCNO | GROUP C | 162 | 0 | 162 | 0 | 100.00 |
| ENDNO | GROUP B | 162 | 0 | 162 | 1 | 99.38 |
| ATTACHST | GROUP C | 162 | 162 | 0 | 0 | 0.00 |
| PARDOCNO | GROUP C | 162 | 82 | 80 | 1 | 98.75 |
| FOOTPRNT | GROUP B | 162 | 162 | 0 | 0 | 0.00 |
| DOCDATE | GROUP C | 162 | 66 | 96 | 1 | 98.96 |
| ESTDATE | GROUP C | 162 | 146 | 16 | 4 | 75.00 |
| DOCTYPE | GROUP B | 162 | 0 | 162 | 1 | 99.38 |
| DOCDDESC | GROUP C | 162 | 0 | 162 | 1 | 99.38 |
| SIGNIF | GROUP C | 162 | 162 | 0 | 0 | 0.00 |
| SUPPORTS | GROUP B | 162 | 162 | 0 | 0 | 0.00 |

FIG. 13

| DATABASE FILE | C:/DATABASE/DBASE4/CIGNA/DOCS.DBF |
| --- | --- |
| AUDIT DESCRIPTION | |
| AUDIT DATE | 05/07/92 |
| AUDIT ACCURACY | 99.1 |
| RECORDS TO AUDIT | 162 |

| GROUP NAME | SAMPLE SIZE | REJECT LEVEL | TOTAL SAMPLE | EMPTY FIELDS | FILLED FIELDS | ERRORS | ACCURACY |
| --- | --- | --- | --- | --- | --- | --- | --- |
| GROUP | 1136 | 13 | 0 | 0 | 0 | 0 | 0.00 |
| GROUP B | 324 | 6 | 1296 | 972 | 324 | 92 | 99.38 |
| GROUP CT | 722 | 15 | 2430 | 1308 | 1122 | 11 | 99.02 |

| GROUP | |
| --- | --- |
| GROUP B | 99.38 |
| GROUP C | 99.02 |

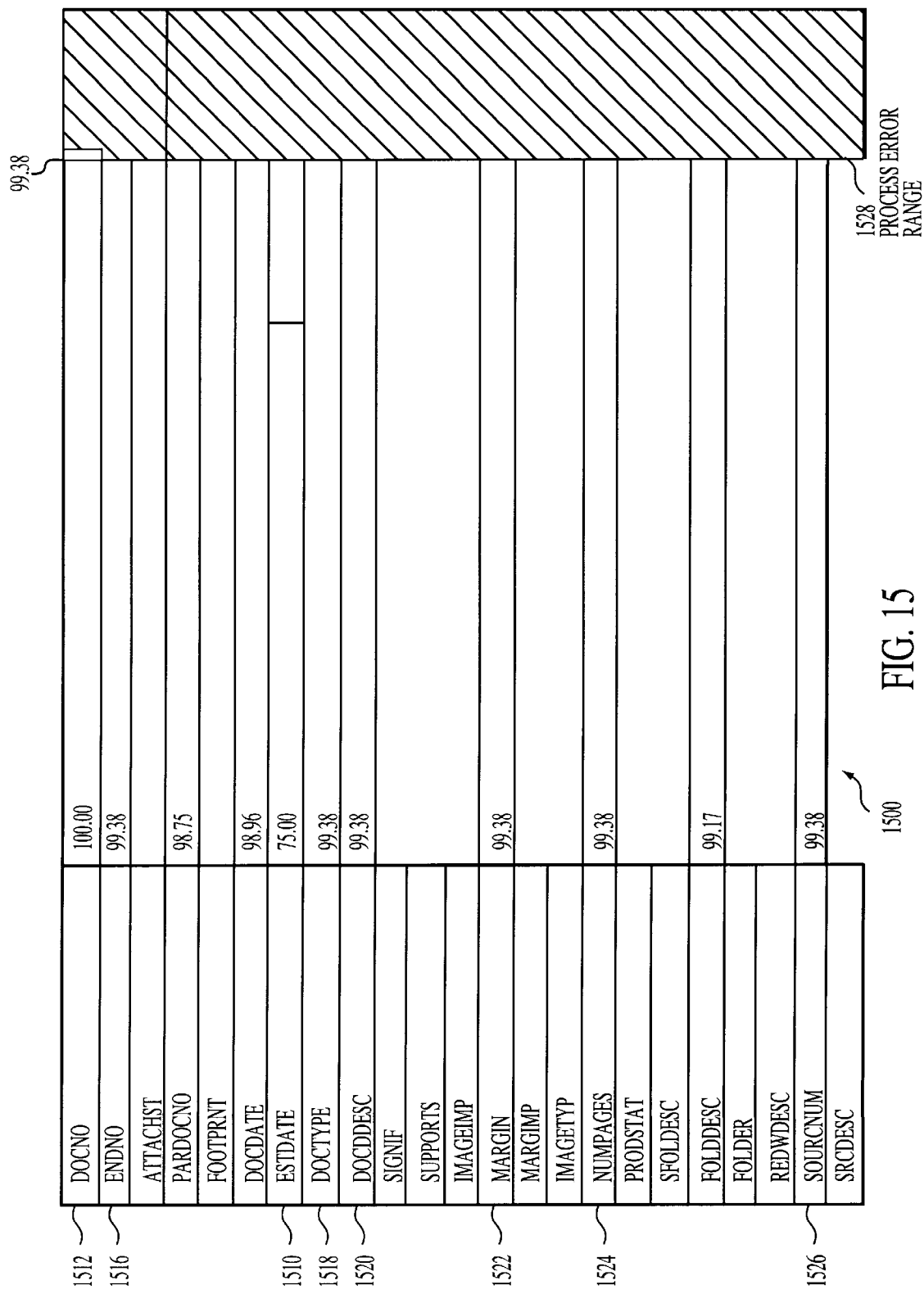

ORIGINAL DATA   ABB100

FIG. 17A

MISPELLED LETTER   AB[C]100

FIG. 17B

ADDITIONAL LETTER   ABB100[0]

FIG. 17C

MISSING LETTER   [ ]BB100

FIG. 17D

TRANSPOSED LETTERS   [BA]B100

FIG. 17E

| | | | | | ... | | | ... | | ... | 0 | ... |
|---|---|---|---|---|---|---|---|---|---|---|---|---|
| ! | @ | # | $ | % | | A | B | | a b | | 0 1 | |

FIG. 18

| | | | | | | A | B | | | | 0 | 1 | |
|---|---|---|---|---|---|---|---|---|---|---|---|---|---|
| 0 | 0 | 0 | 0 | 0 | ... | 1 | 2 | ... | 0 0 | ... | 2 | 1 | ... |

FIG. 19

| | | | | | | A | B | | | | 0 | 1 | |
|---|---|---|---|---|---|---|---|---|---|---|---|---|---|
| 0 | 0 | 0 | 0 | 0 | ... | .1667 | .3333 | ... | 0 0 | ... | .333 | .167 | ... |

FIG. 20

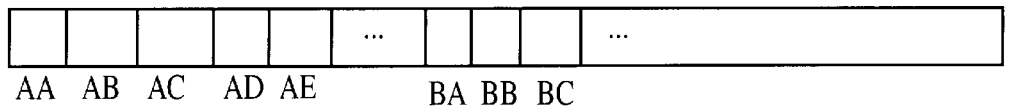
FIG. 21
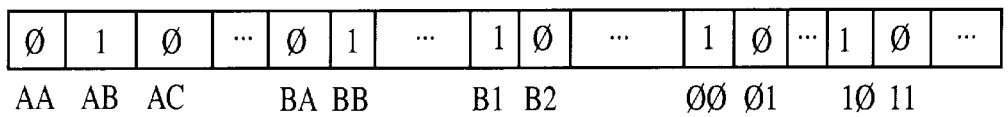
FIG. 22
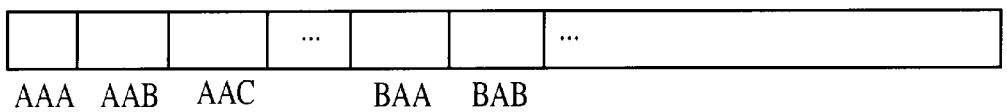
FIG. 23
| ENTRY | ABIOU | AC100 | QX345 | 345MD | XYZABC |
|---|---|---|---|---|---|
| ABIOU | 1 | .8 | Ø | Ø | .2 |
| ACIOU | .8 | 1 | Ø | Ø | .3 |
| QX345 | Ø | Ø | 1 | .6 | .1 |
| 345MD | Ø | Ø | .6 | 1 | Ø |
| XYZABC | .2 | .3 | .1 | Ø | 1 |
|  |  |  |  |  |  |
PRESTRED NEURAL NET PATTERS
FIG. 27

LIST OF NAMES BEFORE NEURAL NET CATEGORIZATION

LAURENCE C. KLEIN
KLEIN, LARRY
JOHN SMITH
JOHN C. SMITH
SMITH, D JOHN
MR. J.C. SMITH
MR. L. KLEIN

CATEGORIES AFTER NEURAL CATEGORIZATION

LAURENCE C. KLEIN
KLEIN, LARRY
MR. L. KLEIN

JOHN SMITH
JOHN C. SMITH
SMITH, JOHN

FIG. 26

COMPUTER SYSTEM AND METHOD OF DATA ANALYSIS

RELATED APPLICATIONS

This application is a continuation application of U.S. application Ser. No. 08/780,666, filed Jan. 7, 1997, now U.S. Pat. No. 5,845,285, which claims priority to U.S. application No. Ser. 08/401,607, filed Mar. 9, 1995, now abandoned, which claims priority to U.S. application Ser. No. 07/880,397, filed May 8, 1992, now U.S. Pat. No. 5,404,509, all of which are hereby incorporated by reference.

BACKGROUND OF THE INVENTION

1. Field of the Invention

The present invention relates generally to a computer system and method of data analysis including pattern matching systems, and more particularly, to a neural network pattern matching system used to determine data similarities.

2. Description of the Related Art

The process of examining repository of electronic information, such as a database, to ensure that its contents are accurate has been used by audit and industry-specific consulting firms over the past decade. It has been extensively applied in the area of litigation support databases, where the information contained in an electronic database is used to support expert testimony or arguments that pertain to a case. The need to have the contents of a litigation support database accurate and complete is crucial, since inaccurate data could lead to imprecise conclusions which will result in either false expert testimony or unfavorable litigation results.

Likewise, most databases used in commercial environments, either for internal purposes (such as inventory databases) or for external sale (such as mailing lists, Dun & Bradstreet lists, phone lists, etc.), are generally acknowledged to be less than 100% accurate. The importance of knowing the accuracy of a database is crucial, since knowing this enables the user of the database to determine the extent it can be relied upon for critical decisions.

The definition of accuracy with regard to a database refers to the number of correct entries as a percentage of the population of entries in a database. For example, if a database has 10 records, each record consisting of fields, the population of entries in the database is 50. If 45 entries are correct, then the accuracy of the database is 90% (45/50*100%=90%). The accuracy of a database is often referred to as the accuracy rate. The converse of the accuracy rate is the error rate, which is simply 100% minus the accuracy rate.

The most precise way to determine the accuracy of a database is to review each and every field within each IS and every record in the database. However, in virtually every real-life situation the cost and time to review an entire database is prohibitive. Instead, a conventional technique is to request a professional trained in information audits to determine the accuracy of a database. The professional selects a subset (called a sample) representative of the database, reviews the sample to determine its accuracy, and extrapolates the results to the entire database. The procedure followed by the professional essentially comprises the four following steps.

In a first step, the professional applies conventional statistical formulae to determine an appropriate size of the sample. The size is determined so that, with a specified level of accuracy, the sample will exhibit all the characteristics and peculiarities of the entire database, including its accuracy rate.

Specifically, the sample size is derived by specifying three variables—target accuracy, minimum accuracy and confidence level—and applying these variables to standard statistical formulae. The target accuracy is the accuracy level desired to be achieved. The minimum accuracy is the accuracy level acceptable as adequate. The confidence level is the level of precision of the process of determining the accuracy.

In addition to deriving the sample size, the standard formulae also derive the reject level, and P0 and P1 values. The reject level is the threshold number of errors that the sample can have before it is deemed as not having met the target accuracy requirement. P0 is the probability that the sample happens to be particularly inaccurate when in fact the database as a whole happens to be more accurate than the sample might indicate. P1 is the probability that the sample happens to be particularly accurate when in fact the database happens to be less accurate than the sample might indicate.

In a second step, the professional randomly selects items from the database until the number selected equals the sample size determined. The items are commonly fields of the database, selected in groups of entire records.

In a third step, the professional determines the number of inaccuracies in the sample. This is done by comparing the contents of the records selected for the sample with the original material that was used to fill the records in the first place.

For example, if the database contains information that represents invoices, then the professional compares the contents of the database records of the sample with the actual information on the invoices. If the database is a mailing list, and it consists of the name, address and telephone number fields, one way to verify the contents of the database record is to try to call the party represented by the record and see if the name, address and phone number are accurate. In general, any data entered into a database must come from an original source, and validating the contents of a database means going to that source and double-checking the contents of the records selected for the sample with the original material.

In a fourth step, the professional determines the accuracy of the sample, and then extrapolates the results to the entire database as follows. When all the records in the sample have been checked against the original source material, the total number of errors is tabulated.

This tally is a number between 0 and the sample size. By dividing the number of errors by the sample size, the professional derives the error rate. By dividing the number of accurate data items by the sample size (or by subtracting the error rate from 100) the professional derives the accuracy rate.

Because the sample records are assumed to represent the entire database, the accuracy of the database is assumed to be the accuracy of the sample, and hence the accuracy of the database is derived.

General Deficiencies

It has been discovered that a substantial deficiency with the current method is that it relies too heavily on the skill and experience of select professionals who know how each step is implemented, the sequence of steps, as well as how the results of one step must be properly applied to initiate the next step. The cost of employing such professionals effectively renders this service unavailable to the majority of database users. Further, even for skilled professionals in this area, it has been discovered that there is no tool to adequately manage database audits. Accordingly, the process is inefficient and non-standardized across various database audits, and hence "unscientific".

Additionally, there are various deficiencies with the approach, method and assumptions used by the professional in conducting database audits according to the conventional technique. Some of these deficiencies can potentially result in inaccurate audits or inaccurate conclusions based on an audit. Other deficiencies highlight the inefficiency of the current method for conducting database audits. Still other deficiencies limit the usefulness of the audit results. These deficiencies will be explained in connection with the four-step outline described above.

Deficiencies with Second Step

A conventional approach for carrying out the second step of selecting samples regards empty fields as equal items to sample as filled fields (i.e., fields with values). However, it has been recognized that the value of a database is generally the information that it does contain, rather than the information that it is lacking. Accordingly, it has been discovered that an audit which includes empty fields is in many instances incorrect, since what users generally want to know is the accuracy rate of the information being used, i.e., of filled fields.

Additionally, it has been realized that errors are less likely to occur in empty fields than in filled fields. Since errors in a database are generally the result of human oversight during the data entry process, it has been discovered that it is more common to enter an incorrect entry than to inadvertently leave a field completely empty. Also, many fields in a database may intentionally be left empty for future consideration.

When included in an audit, such fields are guaranteed to be correct. Therefore, it has been discovered that the results of audits that include empty fields generally overstate the accuracy of the database.

Another deficiency with the conventional second step (selecting the sample) is the inability to adequately handle focus groups of fields. Focus groups are different sets of fields that have different degrees of importance within the database. For example, in a mailing list database, the name, address, and telephone number fields often need to be very accurate so that mailings arrive at their intended destination. However, it has been discovered that fields such as the extended industry code (full SIC code) or secondary business interest fields are often of less significance. Since the target accuracy rate may be different for different groups of fields in the database, and the sample size is directly related to the target accuracy rate, it has been discovered that the appropriate sample sizes for these different focus groups will be different.

In order to conduct an audit on multiple focus groups of fields, often separate audits are conducted, one for each focus group. This is extremely time-consuming and very inefficient. To make such an audit efficient, some professionals select the focus group with the largest sample size as a basis for selecting the sample for all focus groups. The assumption is that using the focus group with the largest sample guarantees an adequate sample for the remaining focus groups.

However, it has been discovered that this assumption is not always correct. For example, it has been discovered that the sample selected may not be adequate if it contains many empty fields. Also, it has been discovered that the assumption may not be correct if the focus group with the largest sample happens to include fields that are heavily populated, while the remaining focus groups have fields that are sparsely populated. In that case, it has been discovered that in selecting enough records to complete the group with the largest sample there will not be enough filled fields collected to complete the samples for the remaining focus groups.

For example, suppose there are two focus groups: Group A which requires 10 items to sample and Group B which requires 5 items to sample. Further suppose that both Group A and Group B represent five fields of a 10 field database. The conventional method of selecting one sample that will meet both samples' requirements is to take a sample based on Group A, which is larger, and assume that Group B's requirement of fewer fields to sample will automatically be met. Suppose all of the fields of Group A are filled, and only one of the five :fields per record are filled in Group B. Further suppose that empty fields should not be selected for the sample. Based on Group A's sample requirement, only two records will be necessary to complete the sample (2 records*5 filled fields/record=10 items to sample). However, Group B, which has a lower sample size requirement will need 5 records to complete its sample in this case (5 records*1 filled fields/record=5 items to sample). Accordingly, it has been discovered that the assumption of selecting a single sample for all focus groups based on the group with the largest sample is therefore not valid.

It has also been discovered that another problem with the conventional method for selecting the sample is the general disregard of, or incapability of selecting, filtered or skewed samples. A filtered sample is one that ignores certain field values or only includes certain field values in the audit. A skewed sample is one that emphasizes certain field values, but does not limit the audit to just those values.

A filter is used to ignore fields or records for the audit that are not going to be used as a basis for a decision. A "clean" audit considers only the information in the database that is of interest.

A skew is used if all the information in a focus group is needed as a basis for a decision, though some information within the focus group is of greater value than other information. Since the information contained in the entire focus group will be used as a basis for a decision, it has been discovered that a typical filter is not appropriate. (A filter would eliminate some of the information from the audit.) A skew will bias the audit toward including records that meet the skew criteria, though records having fields of any value could be selected to audit. A skew is typically used in auditing financial data, where records representing large transactions are of greater interest to financial auditors than those representing small transactions, though since a financial audit must be comprehensive, all is transaction records should have at least the potential of being reviewed.

Because it has been discovered that the conventional database audit technique generally does not support a variable within an audit (i.e., a focus group, filter or skew), let alone any combination of variables, its result often reflects the accuracy of more information than what will be used as a basis for a decision. As a result, it has been discovered that extraneous information that is not of specific interest at the time of the audit may render the result misleading or inaccurate.

Deficiencies with Third Step

A conventional approach for carrying out the third step of reviewing the sample is for the professional to create a report of the data contained in the records that comprise the sample. The source material that represents the sample records are retrieved separately. The professional then compares the contents of the records with the source material that the records represent, and notes any discrepancies.

The primary deficiency with this approach is one of inefficiency caused by a lack of standards. There is no set method, and no automated system, that can take the sample records selected in the prior step and print them to standardized reports that are usable for any audit. Therefore, this step is typically done by separately programming a series of reports for each audit of a different database.

Deficiencies with Fourth Step

The conventional approach for carrying out the fourth step of calculating the result of an audit only determines: (1) whether the audit met a target accuracy specification, and (2) the actual accuracy of the database. While this information is useful when deciding the extent the information contained in the database can be relied upon for critical decisions, it has been discovered that this information does not guide the user of the database as to how the accuracy rate of the database can be improved.

Therefore, what is needed is an approach to auditing databases wherein a user can conduct an audit by focusing specifically on the contents of a database that will be the basis of a decision. The approach must be able to handle empty fields, focus groups, filters and skews correctly. Further, the approach must be standardized so that audits can be conducted in a uniform way across databases, with only the specific focus and statistics varied as needed for each audit. Finally, an apparatus is needed to enable a typical database user, untrained in the skill of database audits, to independently conduct a database audit and to manage various audits.

In addition to the above need to audit a database using an approach that can handle empty fields, focus groups, filters and skews correctly to indicate the overall probability of database accuracy, there is also a need to determine which data stored in the database is in fact inaccurate. That is, there is the need to correct database inaccuracies. For example, most information that is entered into computer systems today is done so by humans, i.e. data entry operators. Even the best data entry operators make data entry errors. One category of error that is often very costly to organizations and almost impossible to effectively find and correct is what is referred to as "duplicate data". The "duplicate data" error occurs when a single piece of information is inadvertently entered into a computer system two or more times in the exact or varied form.

A costly example of this type of error can be found in most corporate accounting systems. As invoices are entered into a corporate accounting system, the same invoice can accidentally be entered two or more times. This can occur either because of a data entry error, i.e. a data entry operator accidentally enters the same data twice, or because the company has been "double-invoiced", that is, invoiced twice for the same product or service. The second invoice is then entered by a data entry operator as if it were the only invoice for the particular product or service. If these "duplicate" invoices are not found, the company pays two or more times for the same product or service. In large companies this problem can cost millions of dollars.

To find "duplicate data" in computer information systems, MIS departments have relied on a combination of algorithmic-based and application-specific solutions. To find "duplicate-data" an Management Information System (MIS) department will learn the style and parameters of the data, and then devise an algorithm to search for specific patterns to find duplicates.

An example of the conventional method of finding "duplicate data" is the way MIS departments typically deal with "duplicate" invoices. Invoices that are from the same company typically follow a certain pattern, such as "ABC100", "ABC101", etc. To find duplicate invoices a special program is created to search for invoices that match on the first several letters. This will produce a listing of all invoices that start with the same set of letters and vary on the remaining letters. A human then reviews the listing and determines which invoices are in fact "duplicates". The primary goal of this method is to find actual duplicates, i.e., invoices with the identical invoice number.

This method of finding "duplicate data" is basically useful in finding exact duplicates. However, it has been discovered that "duplicate data" can be found in a system in a variety of forms that are not identical. FIGS. 17a–17e illustrate, in accordance with the discoveries of the invention described above, the various ways the same data can be entered into a system and still be considered duplicate data, i.e., data which has been entered two or more times identically or in varied form. FIG. 17a illustrates an example of original data. In addition to exact duplicates, the same data can be entered two or more times with any combination of the following types of variations:

Misspelled Letters—a letter is entered incorrectly (FIG. 17b)

Additional Letters—an extra letter is accidentally inserted (FIG. 17c)

Missing Letters—a letter is accidentally left out (FIG. 17d)

Transposed Letters—one letter is accidentally exchanged with another letter (FIG. 17e)

In each of these cases, if the error occurs on the first letter then it has been discovered that the method of finding duplicates by matching on the first several letters will fail. Further, there are a near-infinite combination of errors when these data entry errors described above are combined, so that no matter what algorithm is devised for searching for duplicates, it is guaranteed not to find all errors.

Additionally, for every case where an MIS department suspects that "duplicate data" is a costly problem that must be corrected, a new program must be devised to find these duplicates. This is because the conventional method uses traditional algorithm-based solutions for finding "duplicate data" that is application specific. The pattern that is searched for one system and application may not be relevant to another system or application.

In summary, the conventional method is not only inefficient because it must be rewritten for each instance where "duplicate data" needs to be eliminated, it is ineffective at actually finding most "duplicate data".

SUMMARY OF THE INVENTION

Accordingly, the present invention is directed towards an automated database auditor which: (1) provides database audit capabilities that surpass those offered by professional information auditors, and (2) automates the process of auditing databases so that someone with no prior database audit experience can manage the task.

By using an entity called a project, the present invention supports the various ways someone might view the same database by providing for the flexible selection of focus groups, filters, skews and the choice of whether to count blank entries during an audit. This furthers the purpose of a database audit: to determine the accuracy rate for only that information that will be used as a basis for decisions.

The project is used to store all statistical and user requirements for conducting an audit. Specifically, a user defines a project with one or more focus groups that contain statistical requirements (i.e., target accuracy, minimum accuracy, and confidence level) and whether to include empty fields within the audit. The statistical criteria defined in a focus group can be applied to one or more fields of a database. Additionally, filters and skews are defined separately for each field of a database as needed, and are also stored with a project.

An audit is conducted by selecting a project that correctly specifies the desired criteria for an audit, and applying the project to initiate an audit for a specific database. The database auditor selects the sample to audit and presents the sample to the user in a standardized set of reports or on-line forms.

The database auditor provides an efficient and consistent method to review a sample. The process of review requires that a user compare the sample records of the database with their corresponding source material. The database auditor provides the records to sample, and a choice to review the sample on-line or in printed form. Either way, the forms are consistent from one audit to the next, and require no administrative organization or decisions to set up. This allows any user to actually manage the review process, since all decision-making and organization has been handled by the database auditor. Additionally, since the process is established, and the on-line forms and printed reports are consistent, someone experienced with one audit can easily manage a subsequent audit.

Additionally, in newer environments where electronic images that represent the source material for the records in a database are available, these images are available on-line for the review process. In this way the user need not retrieve the original paper copy of the source material with which to compare the sample records. If images are available that correspond to the database records, the entire review process of the audit, including referencing the source material and checking it against the database records, can be conducted completely on-line.

The user then determines the number of errors contained in the sample and communicates this information to the database auditor. The database auditor then calculates the accuracy of the database, as well as the accuracies of the individual fields and focus groups. Additionally, the database auditor presents an analysis of the database accuracy, by charting areas of accuracy and inaccuracy by field and focus group and highlighting the type of errors found (i.e. process errors versus user errors). By knowing whether the source of inaccuracy is inherent in the process (process error) or caused by human negligence (user error), a user of a database can focus on correcting database inaccuracies efficiently and effectively.

In summary, to set up projects and conduct an audit, the user need only the minimal education commonly required for learning any new application. Using a guidebook to the database auditor and starting with simple audits that do not involve multiple groups, filters and skews, a user with no prior experience can set up a project in minutes. Upon becoming more comfortable with the basics of project setup and management, the user can employ the more sophisticated features of the database auditor to conduct audits that far surpass the quality, precision and sophistication of audits conducted by professionals.

Once a project is set up, any person, regardless of prior experience with database audits or even experience with setting up projects, can conduct an audit. The database auditor manages the tasks of calculating the sample size, selecting the sample, retrieving the sample, placing the sample on-line or in reports, and analyzing the results of the review. The only step the user is required to participate in is checking the original source material with the records that the database auditor has selected for the sample.

Verifying the sample against the original source material is the one thing in the audit process that must be done by a human, since determining errors is a judgment that cannot, without further advances in electronic intelligence, be handled by a computer. What is feasible to automate in the database audit process is automated in the database auditor.

In addition to the above aspects of the invention relating to determining the accuracy of the database overall, the present invention also uses neural network technology to find "duplicate data" in a computer system. A neural network pattern building system is also used to build a pattern for each element or data entry in a computer system. These patterns that represent each entry are then reviewed to search for similar entries, i.e., similar patterns.

By creating a neural network-based pattern for each entry in the computer system, the data can be compared using various pattern matching techniques that solves the limitation of conventional algorithmic-based comparisons. Instead of looking for duplicates where the data begins with the same sequence of alphanumeric characters, the neural-based pattern of one entry is used to compare with the neural-based pattern of the remaining entries in the system. Since neural networks are non-algorithmic, it has been discovered that a similar pattern will match regardless of what type of error occurs and where within the entry the error occurs.

In summary, using, a neural-network to find "duplicate data" eliminates the above described deficiencies with the conventional system. Creating a neural network-based pattern of data is a generic method that can be applied to any system storing data. Therefore, the neural network pattern matching system described herein may be used to find "duplicate data" for i any type of system and for any type of data. In addition, since neural networks are not algorithmic-based, the neural-based pattern of one entry will match on the neural-based pattern of another entry regardless of which of the four types of data entry errors illustrated in FIGS. 17b–17e occur. Exact duplicates will also match, as with the conventional system.

The present invention accomplishes the above mentioned features and advantages by providing a neural network based data comparison system which compares data stored within a database against each other to determine duplicate, fraudulent, defective and/or irregular data. The system includes a database storing data therein, and a pattern database storing pattern data therein. The system further includes a data pattern build system, responsively connected to the database and to the pattern database. The data pattern build system retrieves the data from the database and generates the pattern data formatted in accordance a predetermined patten. The predetermined pattern includes an array having array locations corresponding to each character in a defined character set. The data pattern build system increments a value in each of the array locations responsive to the number of occurrences of each character in the data and stores the array as the pattern data in the pattern database. The comparison system also includes a neural network, responsively connected to the pattern database, which retrieves the pattern data stored therein and compares the pattern data to each other and determines responsive to the comparing when different pattern data match in accordance with predetermined criteria indicating that the different pattern data are duplicate, fraudulent, defective and/or irregular.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

The present invention will be described with reference to the accompanying drawings, wherein:

FIG. 12 shows an audit summary screen presented by a reviewing sample utility of the database auditor;

FIG. 13 shows a field error/accuracy table presented by an audit review and analysis utility of the database auditor;

FIG. 15 shows a field analysis chart presented by the audit review and analysis utility.

FIGS. 17a–17e illustrate common data errors experienced in database computer systems;

FIGS. 18–23 illustrate various different patterns used in the neural network pattern matching system;

FIG. 26 is the data generated by a Kohonan neural network in the neural network pattern matching system;

FIG. 27 is the data generated by a Back Propagation neural network in the neural network pattern matching system.

DETAILED DESCRIPTION OF THE PREFERRED EMBODIMENTS

Overview

Figure 1:
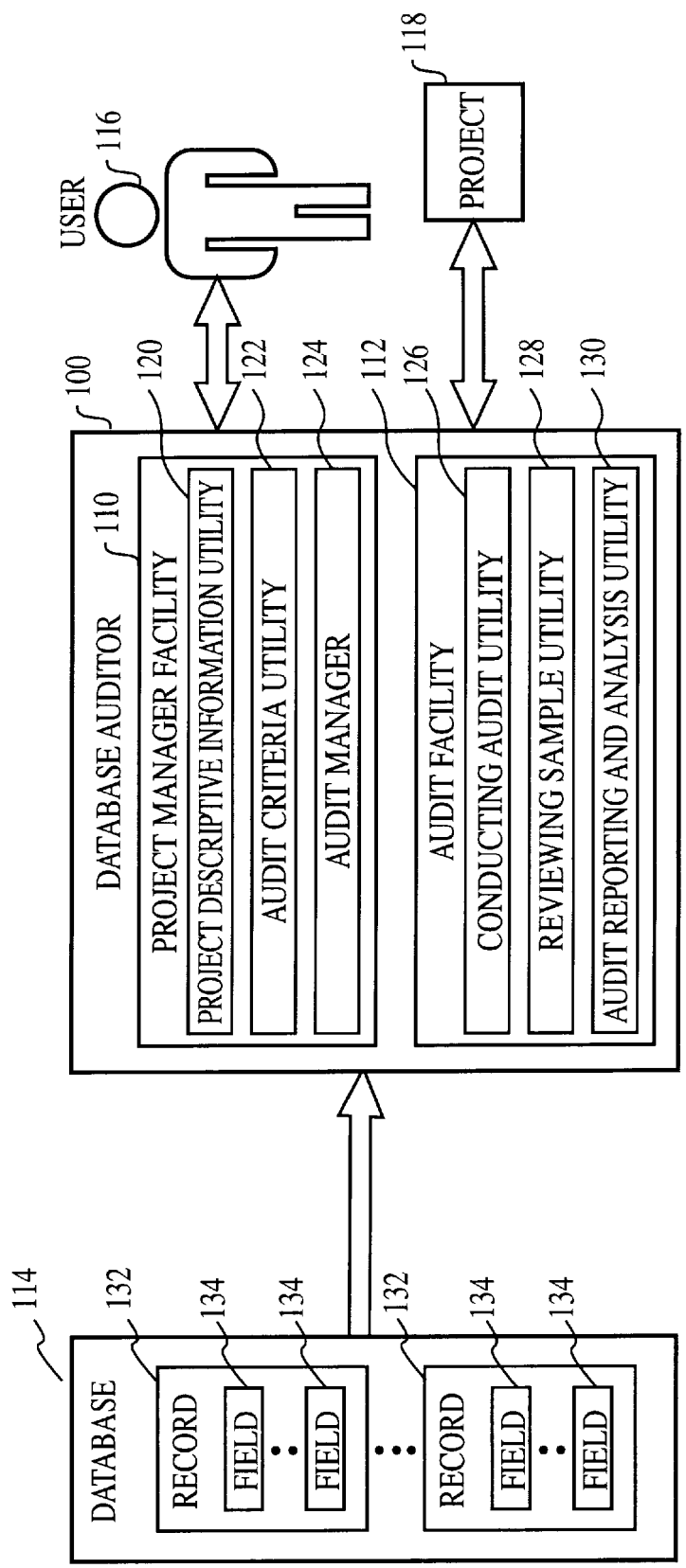
FIG. 1 shows a block diagram of a preferred embodiment of the present invention and the environment in which it operates.

FIG. 1 shows the structure of a database auditor 100 of the present invention. The database auditor 100 comprises a project manager facility 110 and an audit facility 112. The project manager facility 110 provides tools to initiate, manage and analyze audits. The audit facility 112 provides tools to conduct individual audits and to analyze individual audit results. The database auditor 100 communicates with a database 114, a user 116 and one or more projects 118.

The project 118 is a convenient way to encapsulate statistical and user-defined criteria for conducting identical audits for a variety of databases 114 or for the same database 114 many times. Additionally, the project 118 is a management tool to organize and analyze a collection of audits. The database auditor 100 allows the user 116 to save, retrieve and delete projects 118. The project manager facility 110 comprises a project descriptive information utility 120, an audit criteria utility 122 and an audit manager 124. These modules will be described in detail below.

Whereas the project manager facility 110 is concerned with the administration of a collection of audits, the audit facility 112 provides the user 116 with the tools to manage and analyze a single audit. The objective of the audit facility 112 is to enable any user, regardless of their level of database audit experience, to properly conduct a database audit, and to arrive at correct accuracy results. The database auditor 100 places these results in a result file and inserts a pointer to the file in the corresponding project. The database auditor 100 also presents the results (on screen or on paper) to the user 116.

The audit facility 112 provides several enhancements to the audit process. The audit facility 112 comprises a conducting audit utility 126, a reviewing sample utility 128, and an audit reporting and analysis utility 130. These modules will be described in detail below.

A preferred embodiment of the database auditor 100 may be implemented with a programming language having object-oriented capabilities (such as C++) and with the Q+E SQL toolkit (available from Pioneer Software). A preferred embodiment operates on a platform having windowing capabilities such as Microsoft Windows or the X Window System (available from Massachusetts Institute of Technology), and on hardware that includes a pointing device such as a mouse.

Figure 2:
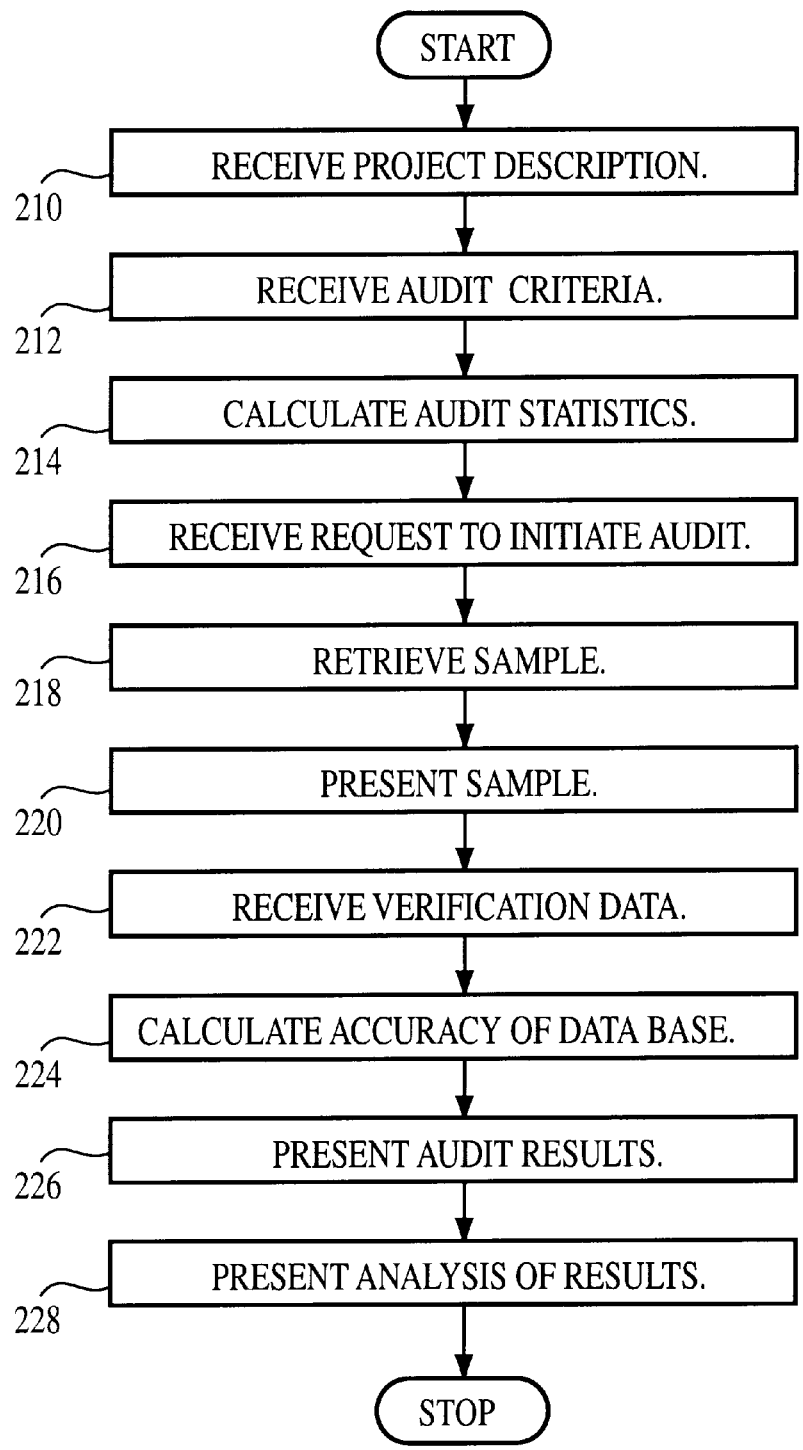
FIG. 2 shows a flowchart of the operation of the database auditor of FIG. 1.

FIG. 2 shows a flowchart which illustrates the method of the database auditor 100. In steps 210–214, the project manager facility 110 defines a project 118. Specifically, in step 210, the project descriptive information utility 120 of the project manager facility 110 inserts descriptive information entered by the user 116 into the project 118. The project descriptive information utility 120 is described below in the section entitled "Descriptive Information". In step 212, the audit criteria utility 122 of the project manager facility 110 inserts audit criteria into the project 118. In step 214 the audit criteria utility 122 calculates the required sample size for the audit. The audit criteria utility 122 is described below in the section entitled "Audit Criteria".

Upon receiving a request to initiate an audit from the user 116 (in step 216), the audit facility 112 audits the database 114 in steps 216–228. To do so, the conducting audit utility 126 first retrieves (in step 218) the appropriate sample for the database 114 being audited. The method by which the conducting audit utility 126 carries out step 218 is described below in the section entitled "Sample Selection". Next, in step 220, the reviewing sample utility 128 presents the sample fields to the user 116. The reviewing sample utility 128 then receives (in step 224) verification data from the user 116 regarding the accuracy of the sample.

In step 226, the audit reporting and analysis utility 130 computes the accuracy of the sample, i.e., the results of the audit. Step 226 is described in greater detail below in the section entitled "Calculating Accuracies". Finally, in step 228, the review and analysis utility 130 presents an analysis of the results to the user 116. Step 228 is described in greater detail below in the section entitled "Analysis of Accuracy".

Note that the steps of the database auditor 100 are presented in the order shown in FIG. 2 for clarity. The steps could be rearranged a large number of ways, so long as the project descriptive information utility 120 and the audit criteria utility 122 were executed to define at least one project 118 before executing the audit facility 112 to conduct an audit as described by a project 118 and to report the results.

Project Manager Facility

Project Descriptive Information Utility

The project descriptive information utility 120 carries out step 210 of FIG. 2 of inserting descriptive information entered by the user 116 into the project 118. The descriptive information includes any information related to the goals and objectives of the project 118, as well as billing-related information. Because this information is not necessary to conduct an actual audit, this information is optional and is filled in as needed by the user 116.

Figure 3:
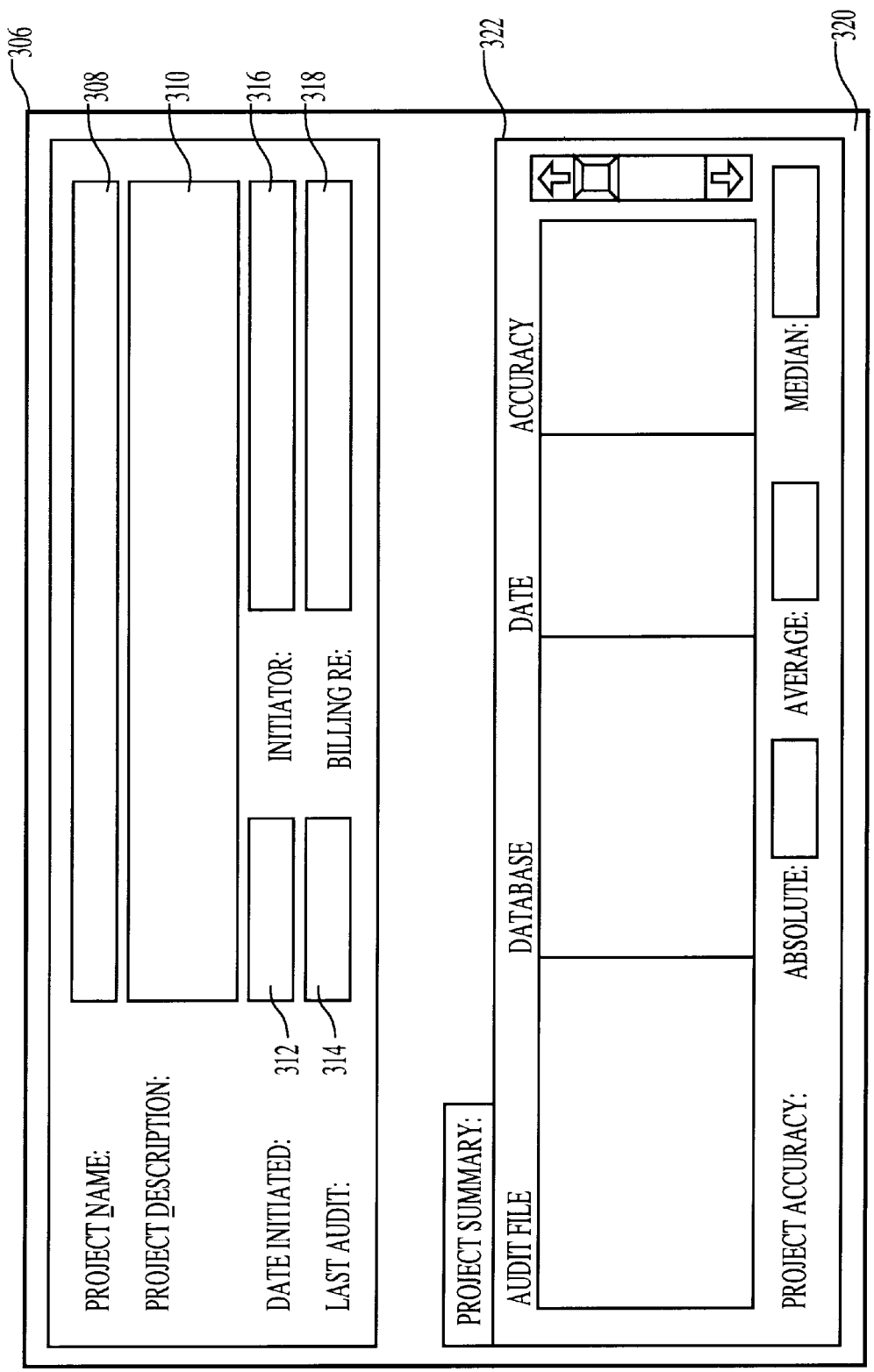
FIG. 3 shows a main database auditor screen presented by the database auditor.

To facilitate user entry, the project descriptive information utility 120 presents a descriptive information screen 306 which forms the top half of a main database auditor screen 300, as shown in FIG. 3. The descriptive information screen 306 comprises the descriptive information tracked for each project 118. Specifically, the screen comprises the following dialog boxes for information that can be tracked on a project level: a project name dialog box 308, a project description dialog box 310, a date initiated dialog box 312 (the date the project 118 was initiated), a last audit date dialog box 314 (the date the most recent audit was added to the project 118), a project supervisor dialog box 316, and a billing reference dialog box 318. The project descriptive information utility 120 receives any data entered on the descriptive information screen and inserts the data into the project 118.

Audit Criteria Utility

The audit criteria utility 122 carries out step 212 of FIG. 2 (inserting the audit criteria into the project 118). The audit criteria are a collection of statistical parameters and user preferences that describe how a class of audits should be conducted. The criteria are maintained on two levels: the group level and the field level.

The group level criteria describe statistical parameters to use for auditing focus groups (i.e., groups of one or more fields within the database 114). A focus group is a convenient way of setting up statistical parameters that can be applied to more than one field. Focus groups are also used to logically organize a variety of fields within a database 114 whose combined accuracy should be analyzed as one unit.

The field level criteria describe how individual fields should be filtered or skewed during the audit process. The field level criteria also link a field to a focus group.

Figure 4:
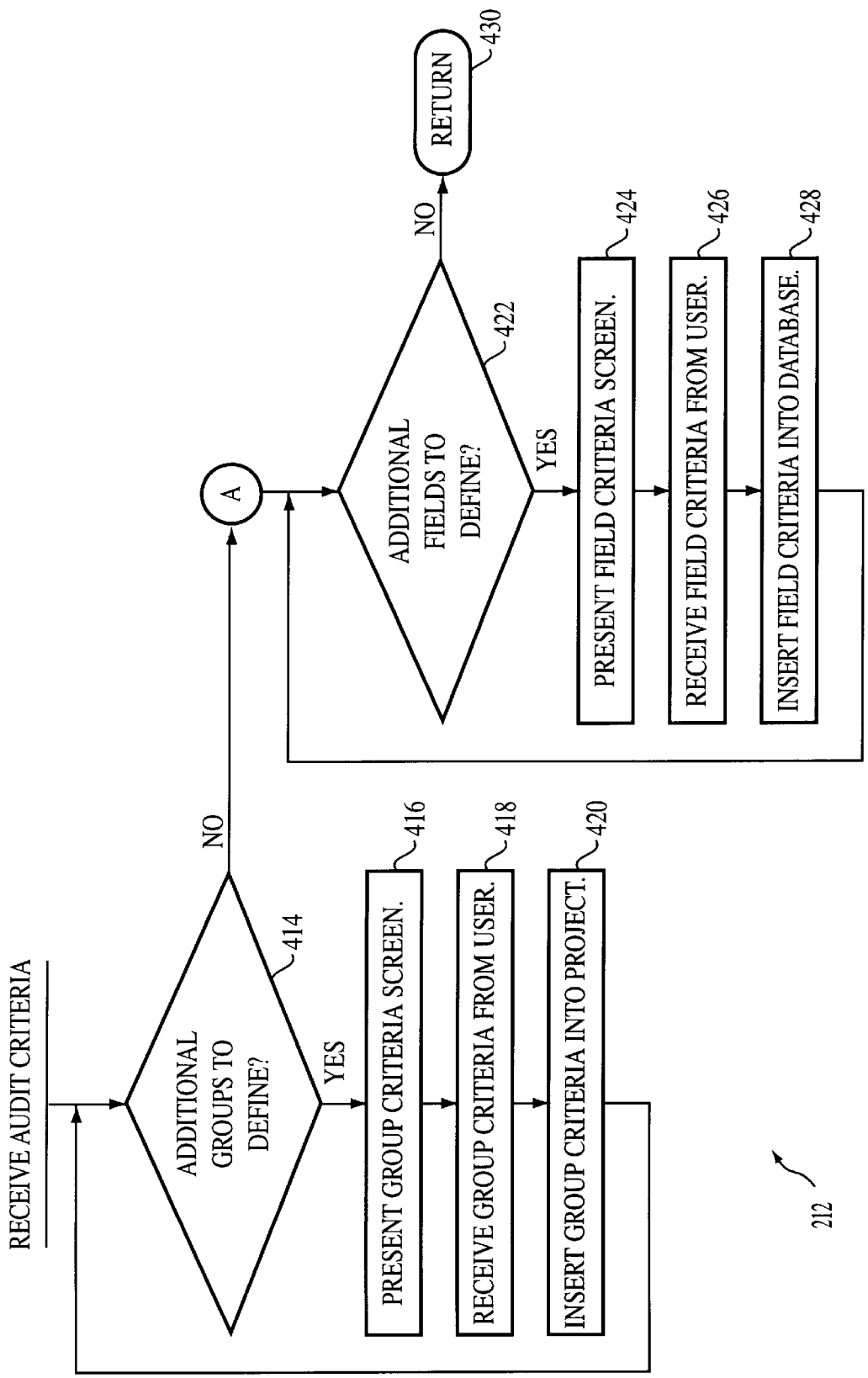
FIG. 4 shows a flowchart of a conducting audit utility of the database auditor.
Figure 5:
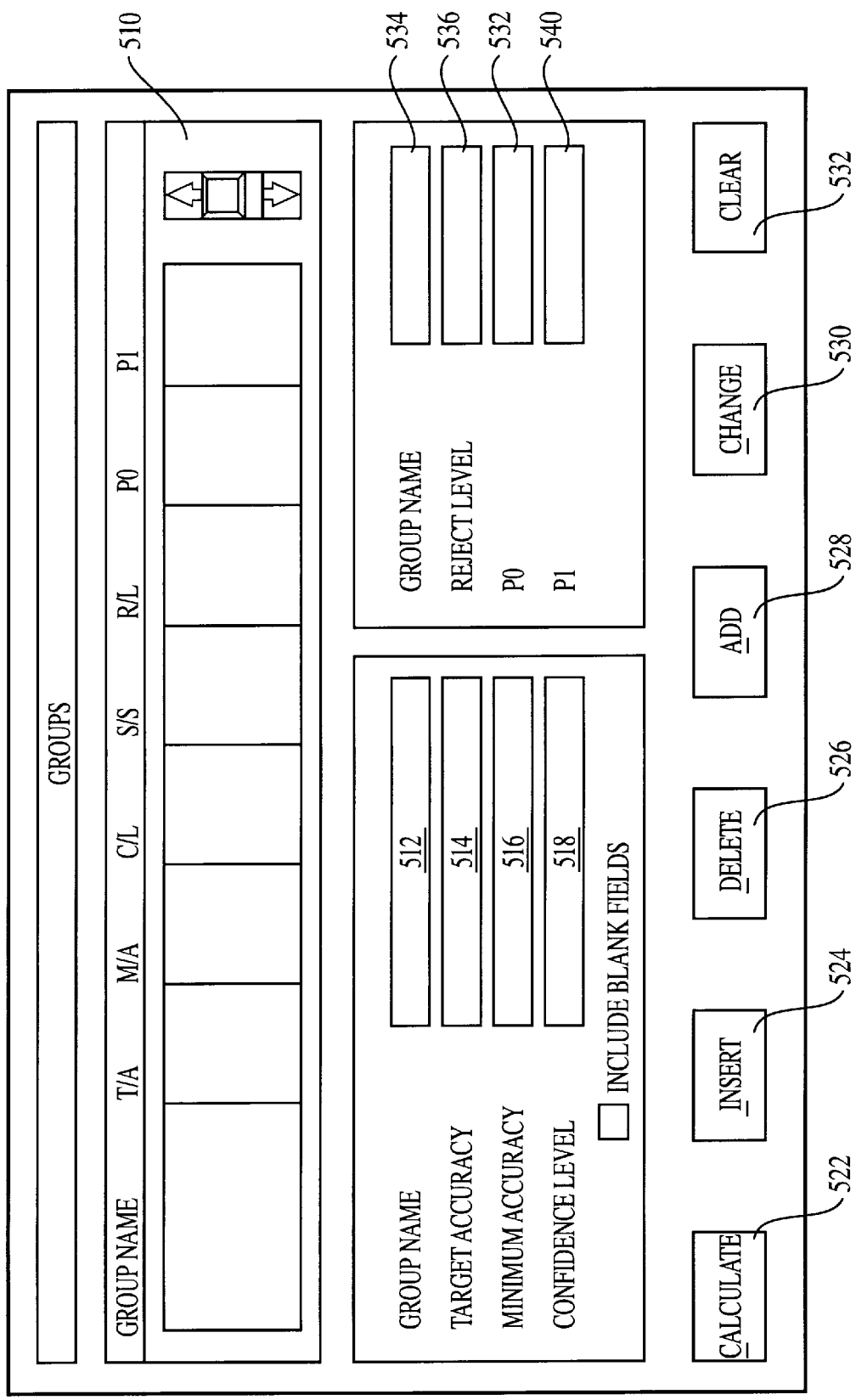
FIG. 5 shows a group criteria screen 500 generated by the conducting audit utility to facilitate the method of FIG. 2.

FIG. 4 shows a flowchart of the detailed method by which the audit criteria utility 122 carries out step 212. In step 414 of FIG. 4, the audit criteria utility 122 determines whether the user 116 wants to define a group. If so, then the steps 416–420 are carried out to determine the group criteria and insert them into the project 118. In step 416, the audit criteria utility 122 presents a group criteria screen 500 (see FIG. 5) to the user 116. Referring to FIG. 5, the group criteria screen 500 comprises a group list 510 of all defined groups and dialogue boxes for receiving the group level criteria, specifically: a group name dialogue box 512, a target accuracy dialogue box 514, a minimum accuracy dialogue box 516, and a confidence level dialogue box 518.

The group criteria screen further comprises an include blank fields check box 522, a calculate button 524, an insert button 526, a delete button 528, an add button 530, a change button 532 and a clear button 534. After presenting the group criteria screen 500, the audit criteria utility 122 waits for the user 116 to enter data.

If the user 116 clicks on the calculate button 524, the audit criteria utility 122 computes a sample size value, a reject level value, a P0 value and a P1 value and displays these values in corresponding display boxes (534, 536, 538 and 540) on the group criteria screen 500. The sample size represents the amount of database information (i.e., the number of database fields) that will represent the entire database 114. The reject level is the threshold number of errors that the sample can have before it is deemed as not having met the target accuracy requirement. P0 is the probability that the sample happens to be particularly inaccurate when in fact the database 114 as a whole happens to be more accurate than the sample might indicate. P1 is the probability that the sample happens to be particularly accurate when in fact the database 114 happens to be less accurate than the sample might indicate.

The user 116 can highlight a group by clicking on its name in the group list 510 with the mouse. The user 116 can then click on the calculate button 522 to have the audit criteria utility 122 compute the sample size, the reject level, P0 and P1 from the values of the target accuracy, minimum accuracy and confidence level in the corresponding dialogue boxes (514–518). The conducting audit utility 126 computes the values using conventional statistical formulae.

The user 116 can then click on the change button 530 to have the data of the highlighted group displayed in the dialogue boxes for editing. Alternatively, the user 116 can click on the delete button 526 to delete the highlighted group from the project 118. If the user 116 clicks on the clear button 532, the audit criteria utility 122 clears the dialogue boxes and the display boxes of the audit criteria window. By clicking on the include blank fields check box 520, the user 116 can specify whether to include empty fields within the group audit. (The database auditor 100 defaults to not including empty entries within an audit).

Once the user 116 has entered the desired group criteria on the group criteria screen, he or she clicks on the insert button 524 or the add button 528. The audit criteria utility 122 then receives the group criteria in step 418 and inserts them into the project 118 in step 420. Control of flow of the project manager facility 110 then returns to step 414 to determine whether the user 116 wants to define additional groups.

The user 116 can define an unlimited number of groups.

Is Once all the groups have been defined, then in step 422 of FIG. 4, the audit criteria utility 122 determines whether the user 116 wants to define a field.

Figure 6:
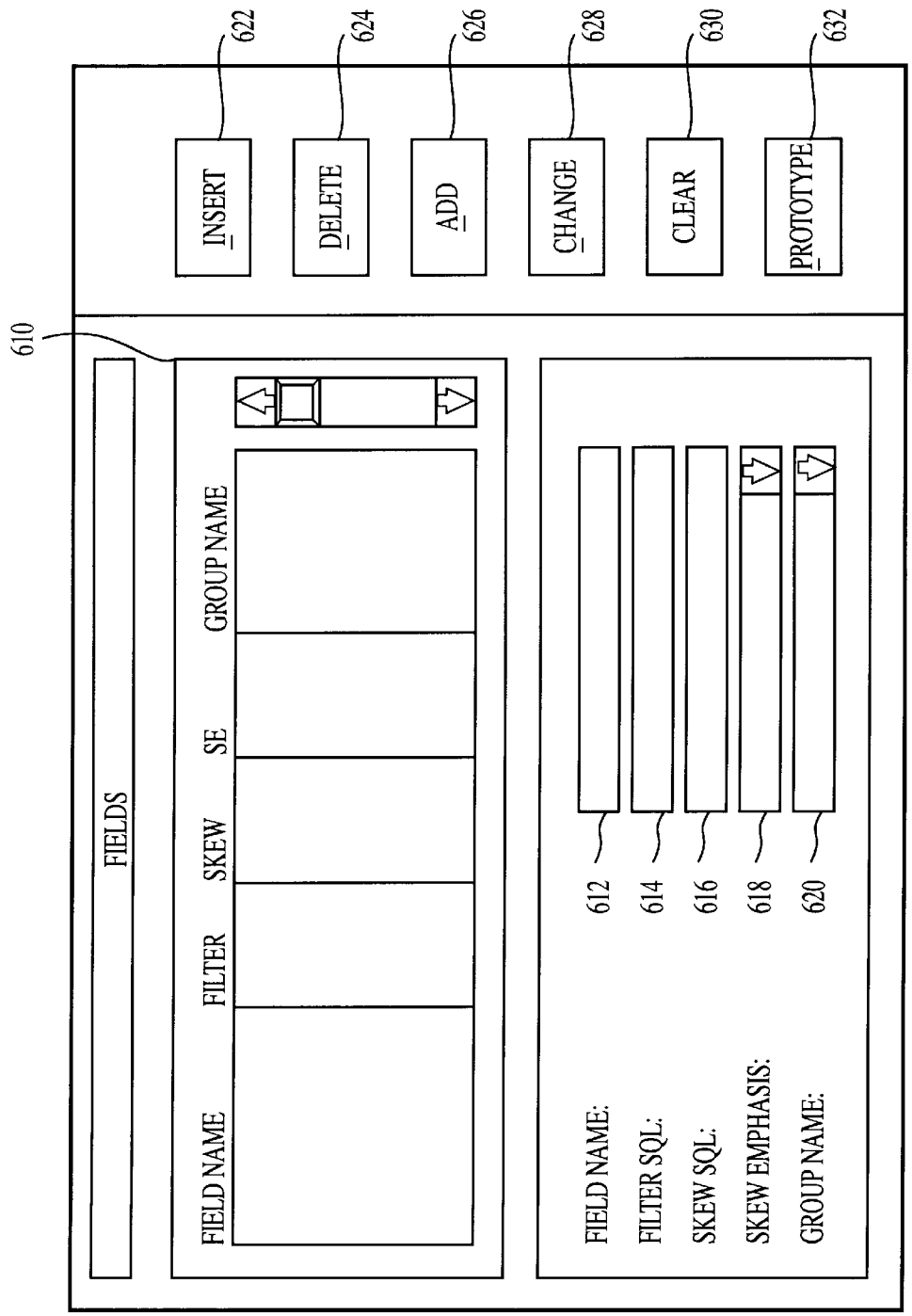
FIG. 6 shows a field criteria screen generated by the conducting audit utility to facilitate the method of FIG. 2.

If the user 116 wants to specify field level criteria, then steps 424–428 are carried out as follows. In step 424, the audit criteria utility 122 presents a field criteria screen 600, as shown in FIG. 6. Referring to FIG. 6, the field criteria screen 600 comprises a field list 610, a field name dialogue box 612, a filter Structured Query Language (SQL) dialogue box 614, a skew SQL dialogue box 616, a skew emphasis dialogue box 618 and a group name dialogue box 620. The field criteria screen 600 further comprises an insert button 622, a delete button 624, an add button 626, a change button 628, a clear button 630 and a prototype button 632. After presenting the field criteria screen 600, the audit criteria utility 122 waits for the user 116 to enter data.

A prototype capability (invoked by the prototype button 632) facilitates the entry of field level criteria. When the user 116 clicks on the prototype button, he or she is prompted for a database 114 to use as a prototype for the project 118. Upon receiving the name of the database 114 from the user 116, the audit criteria utility 122 automatically presents on the field list 610 the field names of the database 114.

For each field in the field list 610, the user 116 can enter the field level criteria in the dialogue boxes. One of the field level criteria is the group to which the field should belong during the audit process (entered in the group name dialogue box 620). Because the field level criteria do not include statistical parameters, a field must be assigned to a group in order to be audited. The field will then be audited using all of the group's statistical parameters. Conversely, if a field need not be audited, it is simply not assigned to a group.

A group can represent one field, several fields, or all the fields of a database 114. If two or more fields are assigned to the same group, then the combination of these fields will be audited using the group's statistical parameters. The results of an audit can then be viewed field-by-field, or group-by-group. The result of an audit, as viewed at the group level, is the aggregate result of all the fields that comprise the group.

The field level criteria further include filters and skews. As described above in the Background section, a filter is a set of parameters used during the audit process to specifically include or exclude fields where values of the field meet the filter criteria. The filter is entered in the field SQL dialogue box 614, and can be any valid SQL statement. The principle notion of the filter is to allow the user 116 to include or exclude field values that are, for example, greater than, less than, or equal to specific values. The SQL syntax allows for sophisticated logic that can be applied to filtering values for each field individually.

A skew (also described in the Background section) is a description that biases the audit toward records having fields which meet the skew criteria. That is, the audit process will favor values that meet the skew criteria but not limit the audit to just those values. Each skew criterion is entered in the skew SQL dialogue box 616, and, like the filter, can be any valid SQL statement. However, unlike the filter, records having fields which do not meet the skew criteria are de-emphasized, but not necessarily eliminated from the audit.

In addition to the skew SQL statement, the user 116 can enter a skew emphasis value (in the skew emphasis dialogue box 618) which ranges from one to ten, with one being the lightest emphasis and ten being the heaviest emphasis. A higher emphasis value indicates that the database auditor 100 will try harder to select values that meet the corresponding skew criteria. As with the filter, skews can be entered individually for each field. Once the user 116 has specified the field level criteria, he or she can define a new field by clicking on the insert button 622 or the add button 626.

The other buttons of the field criteria screen work as follows. By pressing the clear button 630, the user 116 can clear the data from the dialogue boxes. The user 116 can highlight a field criteria by clicking on its name in the field list 610 with a mouse or other pointing device. The user 116 can then click on the change button 628 to have the data of the highlighted field criteria displayed in the dialogue boxes for editing, or click on the delete button 624 to delete the highlighted field criteria.

Once the user 116 has entered the field level criteria, the audit criteria utility 122 receives the data in step 426 of FIG. 4, and inserts it into the project 118 in step 428. Control of flow of the project manager facility 110 then returns to step 422 to determine whether the user 116 wants to define additional fields. The user 116 can define as many fields as there are in the database 114. The audit criteria utility 122 terminates when all field criteria have been specified, as indicated by step 430.

Audit Management

In addition to storing the audit criteria information discussed above, the project 118 also stores the results of audits that have either been initiated from within the project 118, or ones which the user 116 adds to the project 118 at a later date. The user 116 can delete an audit from a project 118, regardless of how the audit was added to the project 118. In this capacity, the project 118 serves as a management tool for a collection of audits. This functionality is provided by the audit manager 124.

Figure 7:
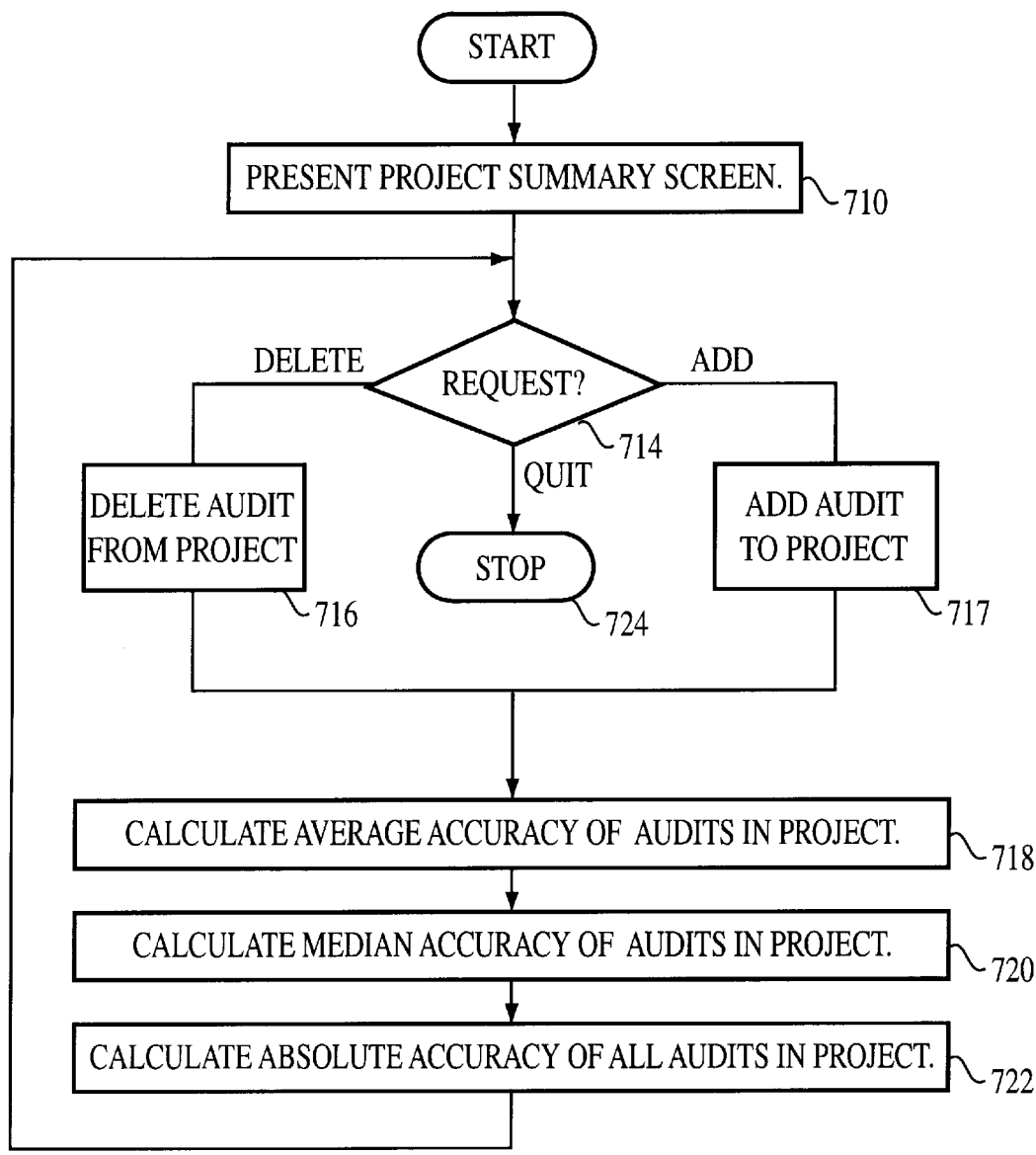
FIG. 7 shows a flowchart of the operation of an audit manager of the database auditor.

FIG. 7 shows a flowchart of the method of the audit manager 124 in carrying out project management tasks. In step 710 of FIG. 7, the audit manager 124 presents a project summary screen 320, which forms the bottom half of the main database auditor screen 300 of FIG. 3. The project summary screen 320 comprises an audit list 322 of information about each audit that the project 118 keeps track of. Specifically, the audit list 322 indicates the name of the audit file, the name of the database 114 that was audited, the date of the audit, and the overall accuracy of the result of the audit.

After presenting the project summary screen 320, the audit manager 124 waits for a request from the user 116. The user 116 can then add or delete audits from the audit manager 124 in the following way. By initiating an audit, the audit manager 124 assumes that the audit should be added to the project 118. The user 116 can also select from menu options to add or delete an audit from the audit list 322. In step 714, the audit manager 124 determines whether the request was to add an audit to the project 118 or delete an audit from the project 118.

If the request was to delete an audit, then in step 716 the audit manager 124 removes a highlighted audit on the audit list 322 from the project 118 by deleting a pointer from the project 118 to the audit file associated with the audit. If, on the other hand, the request of the user 116 was to insert an audit, then in step 717 the audit manager 124 adds the specified audit by inserting into the project 118 a pointer from the project 118 to the audit.

After carrying out the step 716 or 717, the audit manager 124 computes (in steps 718–722) project-level accuracy values that provide useful information about the audits remaining in the project 118. In step 718, the audit manager 124 calculates a straight average of the accuracies of the audits in the project 118. This value is the average accuracy. The audit manager 124 performs the calculation by taking the aggregate accuracy of all the individual audits in the project 118 and dividing by the number of audits in the project 118. Note that the average accuracy assumes that all the audit results are considered equal.

In step 720, the audit manager 124 calculates a second project level accuracy value by taking the audit whose accuracy is such that exactly half the audits in the project 118 are more accurate and half the audits in the project 118 are less accurate. This value is the median accuracy. (For an even number of audits, the median is the average of the two "center" audits.) Whereas all audits are given equal weighing in computing the average accuracy, the median accuracy is simply the mid-level accuracy. The median accuracy can be a better indication of the "average" accuracy figure than the actual average accuracy if the project 118 contains audits whose accuracies are either exceptionally high or exceptionally low. The median average does not take into account the actual accuracies of these extreme audits, except to position the median audit.

In step 722, the audit manager 124 calculates a io third project-level accuracy value by weighing all the audits of the project 118 as though they were conducted as a single audit. This value is the absolute accuracy. The absolute accuracy is calculated by taking the aggregate number of errors of all the audits in the project 118 and dividing by the aggregate number of items (e.g., fields) in the samples of all the audits in the project 118. The absolute accuracy assumes that each item within each audit in the project 118 has equal value.

After step 722, control of flow returns to step 714 to determine the next request of the user 116, which may be any project level request (e.g., initiate an audit, define a new project 118, add or delete an audit from a project 118, etc.).

A simple example illustrates that the three project-level accuracies can produce drastically different views of a collection of audits. The following table shows a collection of audits that comprise a project 118:

| Audit Name | Sample Size | Errors | Audit Accuracy |
|---|---|---|---|
| A | 10 | 1 | 90% |
| B | 20 | 10 | 50% |
| C | 500 | 20 | 96% |

Based on the above table, the average accuracy is 78% (90%+50%+96%)/3). The median accuracy is 90% (half the remaining audits have a higher accuracy and half have a lower accuracy rate). The absolute accuracy is 94% (499 combined correct entries/530 entries in the combined samples). All three project-level accuracy figures are useful and provide a different view of the accuracy of a collection of audits.

Audit Facility

Overview

Whereas the project 118 is concerned with the administration of a collection of audits, the audit facility 112 provides the user 116 with the tools to manage and analyze a single audit. The objective of the audit facility 112 is to enable any user 116, regardless of their level of database audit experience, to properly conduct a database audit, and to arrive at correct accuracy results. The audit facility 112 automates the four-step manual process described in the Background section of this document and provides additional enhancements to the audit process.

Figure 12:
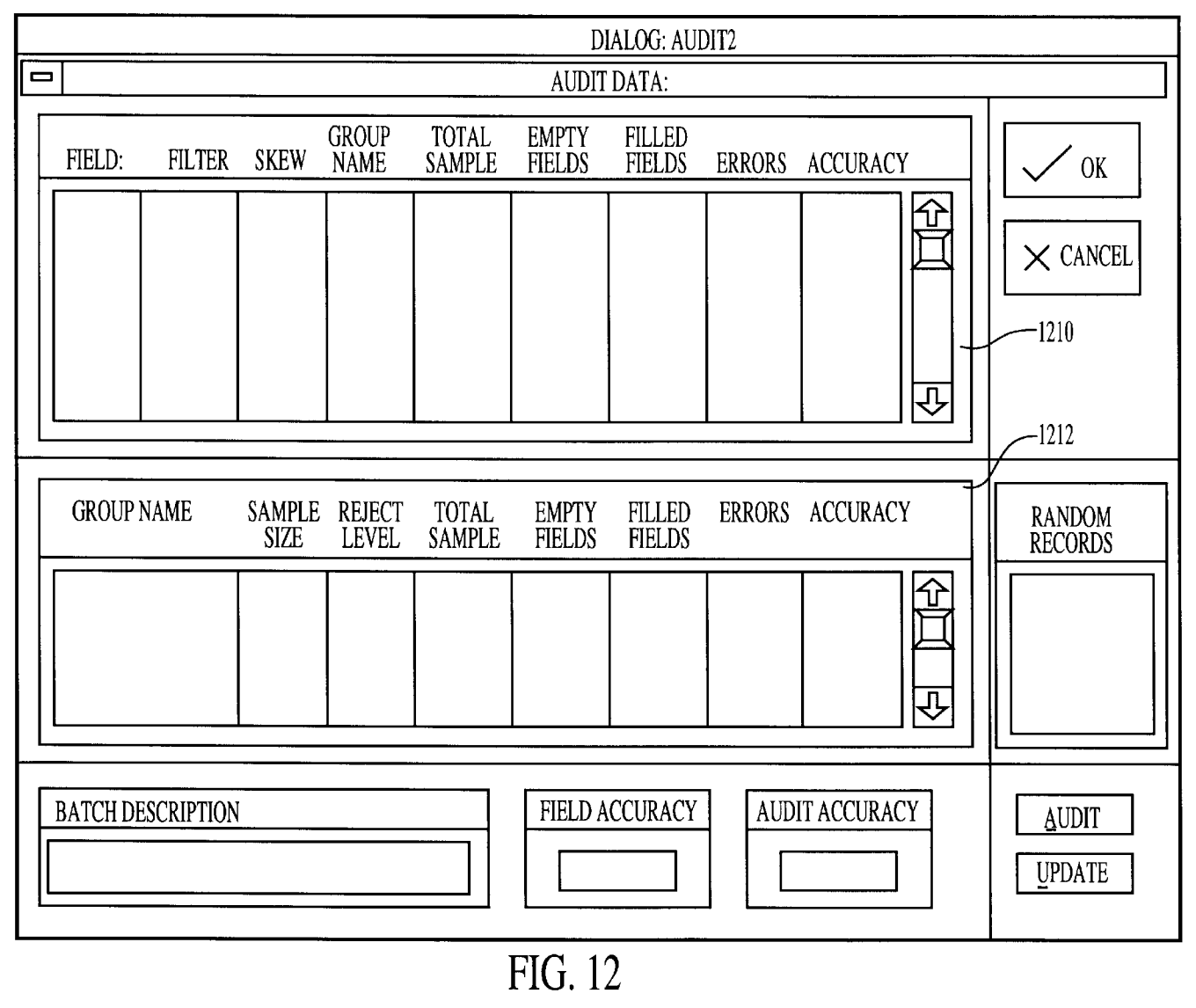

The user 116 who defines the project 118 specifies: (1) whether empty fields are included in the audit, (2) grouping of fields for which a single accuracy result is desired (i.e. focus groups), and (3) filters and skews for individual fields. The user 116 conducting the audit need not be concerned with, or even aware of, these specifications. In fact, all audits appear as simple audits to the latter user 116, as his or her role is limited to reviewing each sample field selected by the database auditor 100 and noting the number of errors in the field on an audit summary screen 1200. (This screen is shown in FIG. 12 and is described below in the section entitled "Review of Sample Fields".) The rest of the audit is managed automatically by the database auditor 100.

Sample Selection

In step 218 the conducting audit utility 126 selects specific items from the database 114 that will make up the sample. The unit size of the items commonly used when referring to a database sample size is the field, since a single field (more so than a record or character within a field) is commonly the basic element of information in a database that is of value. However, what is said about the field is also applicable to a record or character within a field, should those be the preferred basic element in a particular situation.

It is important to select field values from a random set of records, as opposed to a contiguous sequence of records (e.g., the first 1000 records). This is because a sequence of records may have errors that are not contained in another part of the database 114. For example, when data entry clerks enter data into a database, they tend to make more mistakes in the first series of entries, and they tend to improve as they continue entering similar data into the database 114. If the 1000 records for the sample are taken from the start of the database 114, there would likely be more errors in these records than would be found in the final 1000 records. The conclusions based on reviewing the first 1000 records would therefore likely not be reliable, since they are generally less accurate than the remainder of the database 114. Moreover, many commercial databases have pockets of information that are particularly accurate or inaccurate, and selecting the sample using a sequence of logically or physically contiguous records may accidentally pick one of these pockets. So long as the records are randomly selected, there is little or no chance of selecting a group of records that have been entered together, and which may happen to be either much more or much less accurate than the remainder of the database 114.

Assuming the unit of interest is a field, the conducting audits utility 126 randomly selects complete records (rather than individual fields from separate records) to include in the sample. Selecting complete records results in a sample which is consolidated into a smaller and more manageable number of records to review. Selecting complete records does not diminish the validity of the sample because the selection is random.

Figure 9:
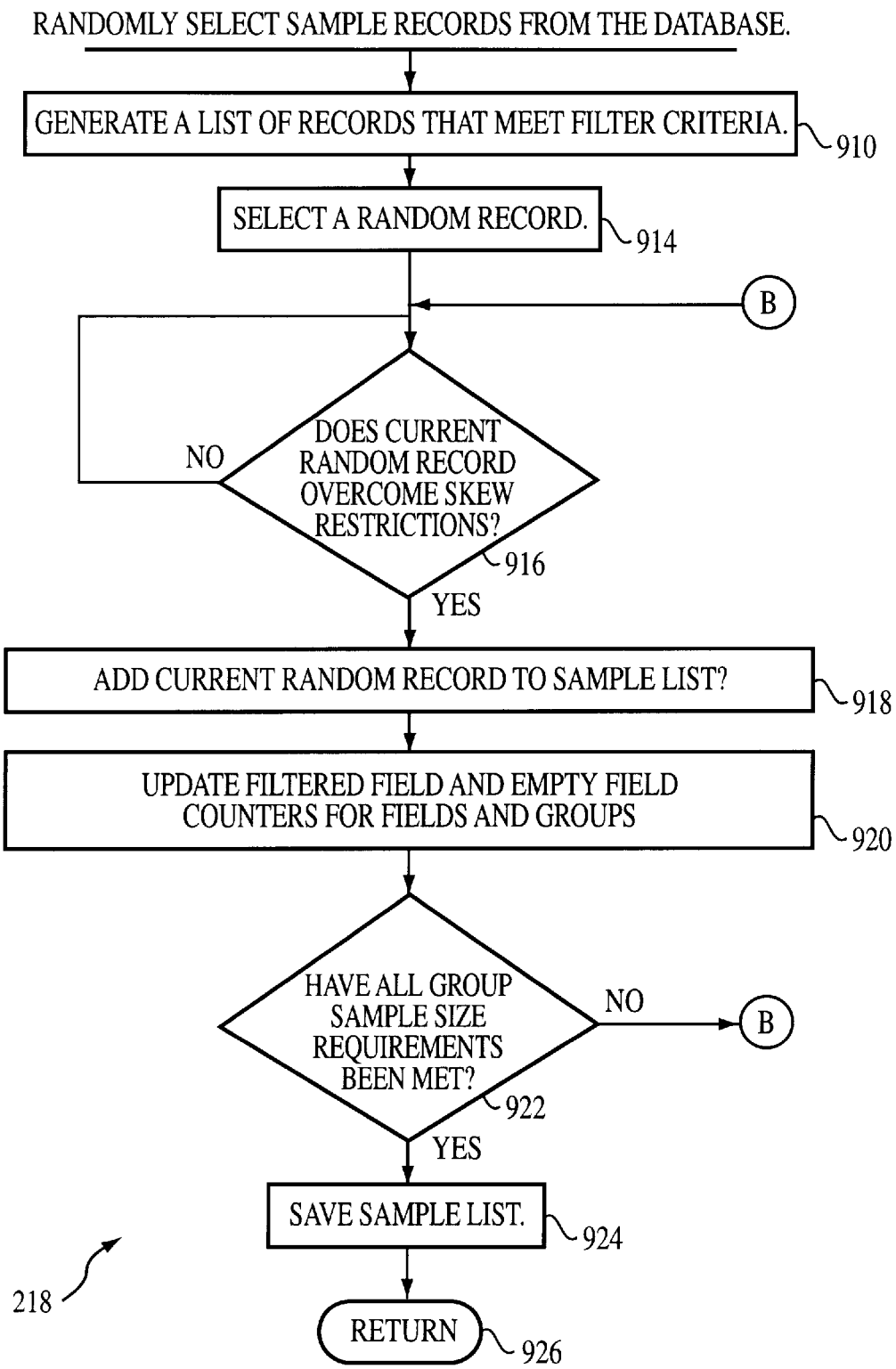
FIG. 9 shows a flowchart of the operation of a conducting audits facility of the database auditor.

FIG. 9 shows a flowchart of the detailed method of the sample selection. First, in step 910 of FIG. 9, the conducting audit utility 126 selects records from the database 114 that meet the filter criteria of the group being audited. It saves these records in a temporary list referred to as a filtered list. By selecting random records from this list, the remainder of the sample selection method operates only on records that meet the filter criteria.

Selecting records that meet the filter criteria is straightforward. Because the field-level filters are all SQL statements, they can easily be combined into one long SQL SELECT statement. The SQL statement can then be passed to a conventional SQL processor, which will return the records that meet the filter criteria. The SQL SELECT statement has the following format:

SELECT FROM <database to audit> WHERE <Field 1> <Field 1 SQL filter>, <Field 2> <Field 2 SQL filter> and might, as an example, look like this:

SELECT FROM "test.dbf" WHERE Field1 >50, Field2= "Mr. Smith", . . .

SQL processors are commercially available for almost all commercially sold databases. In a preferred embodiment, the present invention could use Q+E Library, which is available from Pioneer Software. With Q+E Library, the same program can access a variety of databases without the need to call a variety of SQL tools. SQL and SQL toolkits that can be called from within a program are well known to skilled practitioners.

Figure 10:
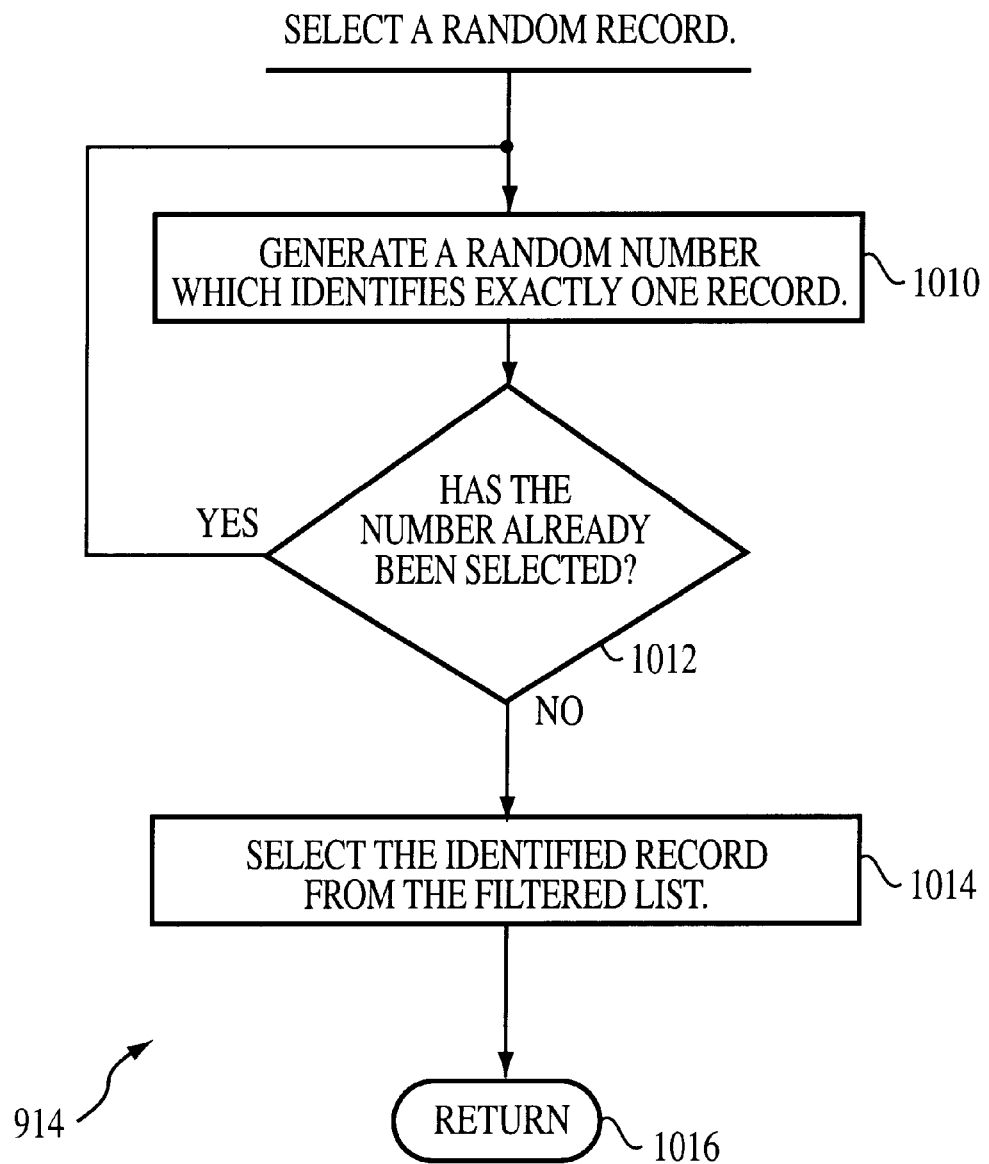
FIG. 10 shows a flowchart of a random record selection step of the flowchart of FIG. 9.

Once it has created the filtered list, the conducting audit utility 126 carries out a loop of selecting random records until all the statistical criteria for the audit are met. The loop comprises the steps 914–922 of FIG. 9. In step 914, the conducting audit utility 126 uses a random number generator to select a unique random number that has not yet been selected, and which can correspond to a record number from the filtered list (i.e., the random number must be between one and the number of records in the filtered list). This record is referred to as the current random record. The current random record will not necessarily be included in the sample to audit, since it must still overcome the skew restrictions of step 916. The method of step 914 is depicted in the flowchart of FIG. 10 and is described below in the section entitled "Random Record Selection".

Figure 11:
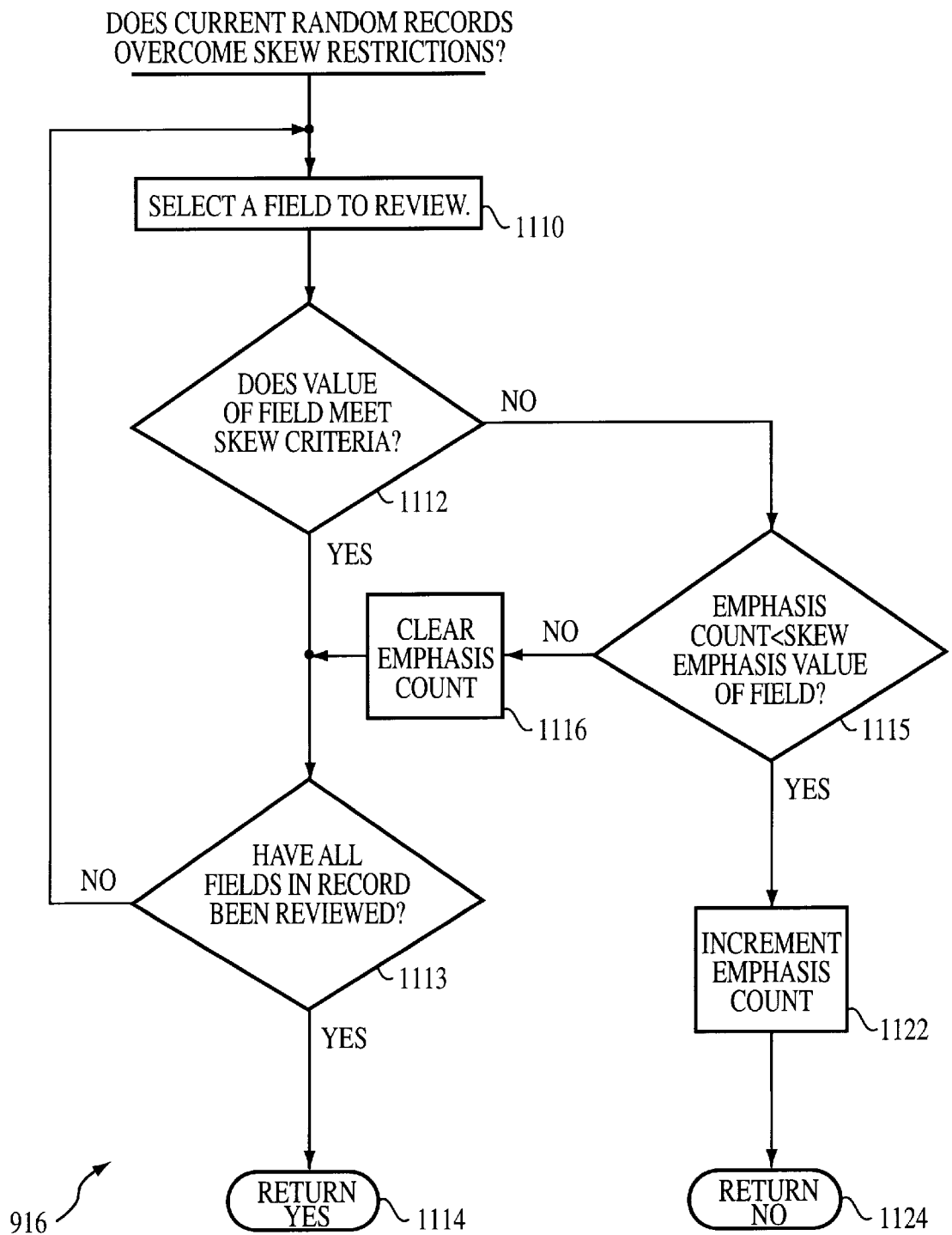
FIG. 11 shows a flowchart of a step of the flowchart of FIG. 9 of determining whether a record overcomes skew restrictions.

In step 916, the conducting audit utility 126 determines whether the current random record overcomes the skew restrictions. The skew restrictions are dictated by the skew criteria. The skew criteria, like the filter criteria, are a set of SQL statements for each field. The method of the skew restriction determination is illustrated in the flowchart of FIG. 11 and is described below in the section entitled "Skew Restriction Determination".

If the current random record does not overcome the skew restrictions, then control of flow of the conducting audit utility 126 returns to the step 914 to randomly select another record to review. Otherwise, steps 918–926 are carried out as follows. In step 918 the current random record is added to a list of random records that comprise the sample. This list is referred to as the sample list.

Then, in step 920, the conducting audit utility 126 updates filled field and empty field counters for the sample list as well as for each group in the project 118. The sample list counters keep track of the aggregate total of filled fields and empty fields in all the records in the sample list. The counters for each group indicate the aggregate total of filled fields and empty fields in that group.

The conducting audit utility 126 then uses the sample sizes calculated for each group in the step 214 and the counters updated in step 920 to determine (in step 922) whether the sample size requirements are met for the project 118. It does so by comparing the calculated sample size for each group to the number of fields in that group in the sample list. The number of fields counted in the sample list of a group is generally the value of the filled field counter of the group.

However, if the user 116 specified (on the group criteria screen 500 of FIG. 5) that empty fields are to be counted, then the number of fields counted in the sample list is the sum of value of the filled and empty field counters of the group.

The project sample size requirements are met only if the number of fields counted in the sample list for each group is not less than the sample size calculated for that group. In this way, a run-time decision is made as to whether each group has satisfied its sample size requirement.

If the sample size requirements of any group is not met, control of flow returns to step 912 to select additional random records. Otherwise, the sample list is complete. It is therefore saved in step 924, and the conducting audit utility 126 ceases to randomly select random records (see step 926).

Random Record Selection

Step 914 of FIG. 9 involves selecting a random record. There are two common methods of randomly selecting records. The first method is to use a random number generator to generate random numbers between 1 and the number of records in the filtered list. Each number generated in this manner would identify exactly one record in the filtered list. For example, if the numbers generated were 12, 78, 103 . . . , then records 12, 78, 103 . . . are selected.

The second method often used for selecting random numbers is by dividing the number of records in the filtered list by the number of records needed for the sample, and then selecting records according to the quotient. For example, using a sample of 1000 records for a database of 100,000 records, every 100th record would be selected for the sample. The second method takes a sample which is equally spread over the entire database 114. It is generally easier to implement the second method programmatically than the first method.

FIG. 10 is a flowchart which illustrates the method of step 914. In step 1010, the conducting audit utility 126 generates a random number using the first or the second selection method discussed above. In step 1012, it determines whether the record corresponding to the random number is already in the sample list. If so, then control of flow of the conducting audit utility 126 returns to step 1010 to generate another number from the list.

Otherwise, in step 1014, the conducting audit utility 126 selects from the filtered list the record identified by the random number. Control of flow then returns to step 916 (see step 1016).

Skew Criteria Determination

The purpose of step 916 of FIG. 9 (determining whether the current random record overcomes the skew restrictions) is to bias the sample records according to the skew criteria. The conducting audit utility 126 effects this biasing by consecutively rejecting a certain number of records for which the skew criteria is not met, and then accepting a record regardless of whether the skew criteria is met (assuming the record is not rejected because of other skew restrictions). The number of consecutive rejections is determined by the skew emphasis, which, as discussed, is specified by the user 116 on the field criteria screen 600 of FIG. 6. Accordingly, the higher the emphasis number, the more tries the method will have at finding the correct value.

By allowing more than one try at a skew value, the conducting audit utility 126 is more likely to select values that meet the skew criteria. However, since there is a threshold of tries before the method gives up trying to meet the skew criteria, records having fields which do not meet the skew criteria can be selected. Accordingly, the skew does not eliminate the chance of any value being selected, though values that meet the skew criteria are more likely to be selected.

FIG. 11 is a flowchart which illustrates the detailed method of carrying out step 916. In step 1110 of FIG. 11, the conducting audits facility selects a field of the record. This field is referred to as the current field. In step 1112, the conducting audit utility 126 determines whether the value of the current field meets the skew criteria. The conducting audit utility 126 makes this determination by sending the SQL processor the SQL statement of the current field.

If so, the current random record will thus be selected for the sample so long as, for all other fields in the record, the skew criteria are met or the skew emphasis is overcome. Accordingly, in step 1113, the conducting audit utility 126 determines whether all fields in the record have been reviewed. If so, then the current random record meets the skew restrictions. (See step 1114.) Otherwise, control of flow returns to step 1110 to select another field of the record to review.

If in step 1112 the skew criteria were not met, then the current random record is processed as follows. In step 1115, the conducting audit utility 126 compares the current field's skew emphasis to an emphasis count of the field of which the current field is an instance. The emphasis count indicates the number of consecutive records for which the skew criteria were not met.

If the emphasis count is not less than the skew emphasis, then enough consecutive records have failed the skew criteria to overcome the skew emphasis. In that case, the emphasis count is reset to zero in step 1116. The current random record will be selected for the sample so long as, for all other fields in the record, the skew criteria are met or the skew emphasis is overcome. Accordingly, control of flow goes to step 1112, which is described above.

If, on the other hand, the emphasis count is found to be less than the skew emphasis in step 1114, then the current field has not overcome the skew emphasis. Accordingly, in step 1122, the conducting audit utility 126 increments the emphasis count to reflect the failure of an additional consecutive record in meeting the skew criteria. The current random record does not meet the skew restrictions, as indicated in step 1124.

Review of Sample Fields

The reviewing sample utility 128 carries out step 220 (presenting the sample fields to the user 116) as follows. It first displays an audit summary screen 1200, depicted in FIG. 12. The audit summary screen 1200 provides the user 116 with all the summary information about the sample that was just selected in step 218.

Specifically, the audit summary screen 1200 contains a list of the groups in the project 118 (called a group list 1210) and a list of the fields in the project 118 (called a field list 1212). For each entry on the field list, there is a field slot which indicates the filter associated with the field, a skew slot which indicates the skew associated with the field, and a group slot which indicates the group that the entry is a member of. For each entry on the group list, there is a sample size slot and a reject level slot.

For each field entry and for each group entry, there is a total sample slot which indicates the total number of fields that comprise the sample for the field or group respectively. This number may be larger than the sample size might indicate, since the sample is comprised of fields clustered as a record. Because the last record may contain marginally more fields than what is precisely required by the sample size, this slot records the actual number of fields selected for the sample. The actual, rather than required, number of fields in the sample is used to calculate the accuracy of the individual fields and groups, as well as the overall accuracy of the audit, as described below.

Additionally, each field entry and each group entry contains an empty fields slot which indicates the number of empty fields, a filled fields slot which indicates the number of filled fields, an errors slot which maintains the error count, and an accuracy rate slot. The audit summary screen 1200 further comprises an overall accuracy slot to maintain the overall accuracy result of the audit.

All but the errors slot, accuracy rate slot, and overall accuracy result slot are filled prior to the actual review of the sample by the user 116, based on the selection of the sample. The slots filled by the reviewing sample utility 128 prior to the user review of the sample are simply descriptive information about the contents of the sample.

The reviewing sample utility 128 calculates the accuracy slots after the user 116 compares the sample with the original material to determine the errors contained in the sample, and after the user 116 fills the errors slot for the fields list 1210. Specifically, in step 222 the user 116 reviews the sample to find any errors, as described below. Then, in step 224 the user 116 inserts the number of errors found in each field into the audit summary screen 1200. In step 226, based on the error count recorded on the fields list 1210, the reviewing sample utility 128 calculates the error counts for each group and displays these on the group list 1212.

The reviewing sample utility 128 further computes the accuracies to display in the accuracy slots of the fields list 1210 and the groups list 1214, as well as in the overall accuracy slot. The data on the audit summary screen 1200 can be saved and updated within the database auditor 100.

Figure 8:
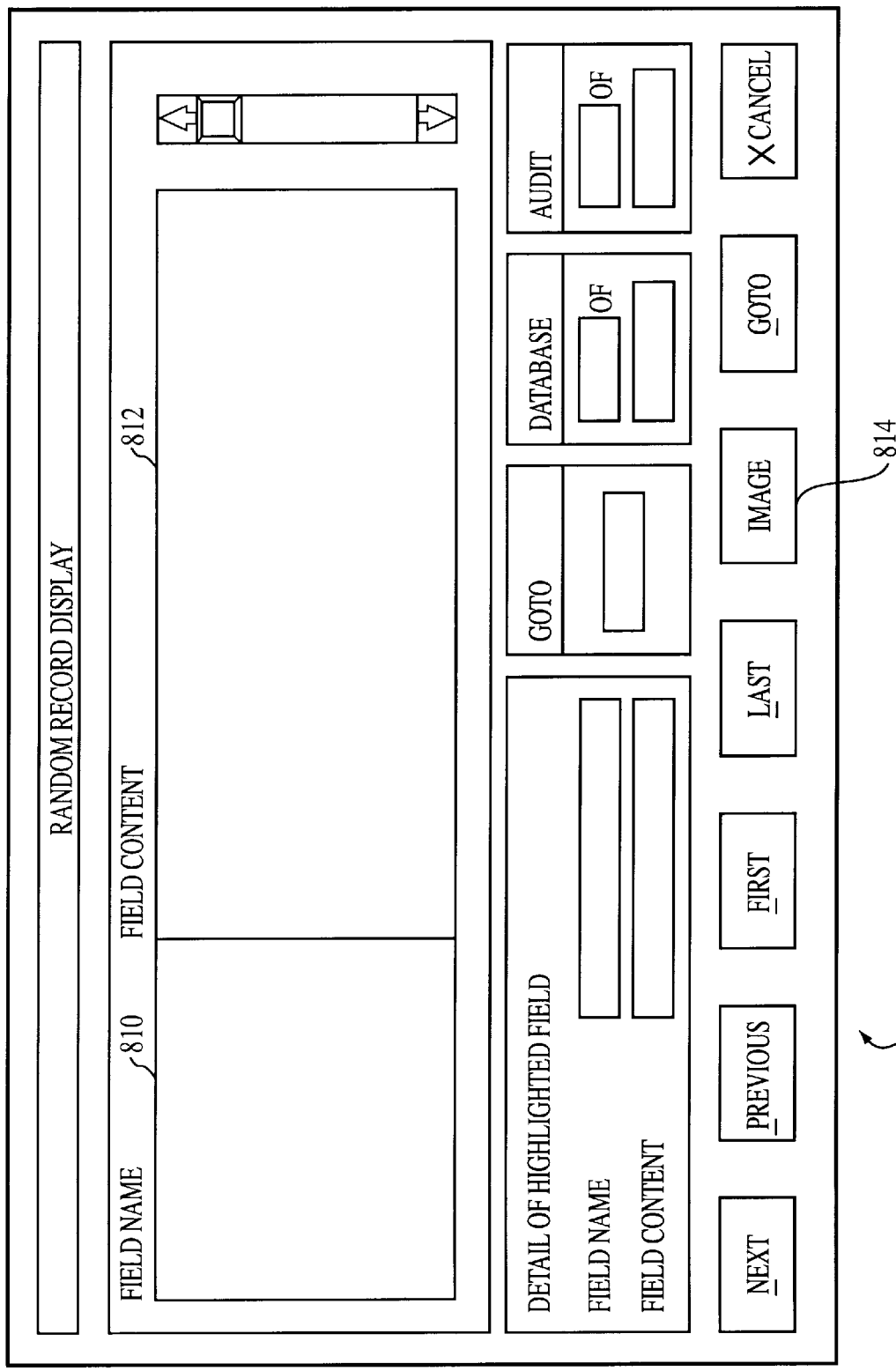
FIG. 8 shows a sample record review screen presented by a reviewing sample utility of the database auditor.

The user 116 has two options as to how the sample is presented to him or her in the step 220: on-line review and review by report. The on-line review is particularly useful if the records of the database 114 to be audited have corresponding electronic images of the original source material. If that is the case, the reviewing sample facility presents a sample record review screen 800, which is depicted in FIG. 8. This screen displays the fields of sample records (in a field name display box 810 and a field content display box 812), along with their associated images, one record at a time.

To pull an image, the user 116 clicks on an image button 814 of the sample record review screen 800. Images are retrieved using an image retrieval toolkit, such as the Kofax toolkit. Kofax toolkit and image retrieval toolkits that can be called from within a program are well known to skilled practitioners.

The user 116 then compares the image with the contents of the corresponding database record for each record in the sample. In step 224, the user 116 notes any discrepancies on the audit summary screen 800. The user 116 records each discrepancy in a slot corresponding to the field where it occurred.

If, on the other hand, there are no electronic images that represent the source material for the database 114, then the reviewing sample utility 128 conducts the review by generating reports as follows. It prints a set of reports that essentially provide the on-line information available presented on the audit summary screen 1200 and on the sample record review screen 800. The reports include a List of Random Records Report, a Record Contents Report, a Comparison Report and an Error Recording Form.

The List of Random Records Report is a listing of the records that comprise the sample. This list is used to retrieve the source material using just a few key descriptor fields taken from the database 114. The Record Contents Report is a listing of the complete contents of the records that comprise the sample. The Comparison Report is the same as the Record Contents Report, with extra space to enter corrections, if necessary. The Error Recording Form, like the on-line audit summary screen 1200, allows the user 116 to note the error count by field during the review process. Once the review process is completed and the user 116 fills the Error Recording Form, the error count for each field is entered onto the on-line audit summary screen 1200 and saved.

Calculating Accuracies

Once the user 116 has entered the errors in the sample fields on the audit summary screen 1200, then in step 226 the reporting and analysis utility 130 automatically computes the accuracy of the sample, i.e., the results of the audit. No calculations are required of the user 116. The database auditor 100 provides accuracy data on the field level, the group level and the database level. The reporting and analysis utility 130 automatically updates the accuracy data as the user 116 enters errors on the audit summary screen 800 as follows.

Since the user 116 enters the number of errors on the audit summary screen 800 screen for each field during the audit process, the reporting and analysis utility 130 calculates the field accuracy rate by dividing the number of correct entries by the sample size for each field. The sample size for each field is either the number of filled entries for the field, or the combined number of filled and empty entries for the field, depending on whether the field belongs to a group for which the user 116 has specified that empty fields are counted.

The reporting and analysis utility 130 calculates each group accuracy rate by taking the aggregate number of correct entries that comprise the group and dividing by the sample size of the group. If the user 116 has specified that empty fields are counted for the group, then the number of correct entries includes all of the empty fields in the sample. Otherwise, empty fields are ignored.

The reporting and analysis utility 130 calculates the overall audit accuracy by taking the total aggregate number of correct entries for all the groups and dividing by the total number of fields to sample for all the groups.

Analysis of Accuracy

Figures 14, 16:
FIG. 14 shows a group error/accuracy table presented by an audit review and analysis utility of the database auditor.
FIG. 16 shows a group analysis chart presented by the audit review and analysis utility.

In addition to providing accuracy data on the field, group and database level on the audit summary report screen, the reporting and analysis utility 130 presents these accuracies in a series of reports. Specifically, it generates two accuracy/error tables (one for fields and one for groups) that list in tabular format the accuracy and error rates for each field and each group of the audit. FIG. 13 shows a field error/accuracy table, and FIG. 14 shows a group error/accuracy table.

The reporting and analysis utility 130 also generates two analysis charts (one for fields and one for groups) that show the accuracy rate for each field and each group. FIG. 15 shows a field analysis chart 1500, and FIG. 16 shows a group analysis chart 1600. The purpose of presenting accuracy rates in the charts, in addition to numerically listing them in a table as in the error/accuracy tables, is to enable the user 116 to easily identify "dips" and "surges" in accuracy. A dip in accuracy is a line item (i.e., a field or a group) that is particularly less accurate than the remaining line items, while a surge is a line item that is particularly more accurate than the remaining line items.

For example, on the field accuracy chart 1500, the field represented by line C contributes heavily to the inaccuracy of the group accuracy figure, while the field represented by line E contributes heavily to the accuracy of the group accuracy figure. On the group accuracy chart 1600, dips and surges represent groups that contribute heavily to the inaccuracy or accuracy (respectively) of overall accuracy of the database 114.

What is even more important about the field accuracy chart 1500 and group accuracy chart 1600 is that they can indicate the process error range. As described earlier, the lowest value of the process error range is the point at which the rate of accuracy is less than 100% due to errors based on the process of entering data into the database 114. For example, the process error may reflect a level of human performance, which, even under the best of circumstances, is less than 100% accurate. The accuracies that do not reach the process error range are likely due to user errors, i.e., errors caused by a misunderstanding of the process of entering data into the database 114.

User errors are often easily corrected. They can be rectified, for example, by education to enable those entering the data to overcome the misunderstanding. However, process errors are more difficult to correct since this usually involves some overhaul of the process and method used for entering information into the database 114, which cannot always be modified without difficulty. Accordingly, enabling the user 116 to identify process and user errors facilitates efficiently improving the accuracy of the database 114.

Calculating the Process Error Threshold

The process error threshold is calculated as the median of the individual field or group accuracies. In the field accuracies chart 1500, the median accuracy is the average of lines C and D. Since the process will have some built-in error factor, this is generally the level that approximates the middle ground between what is unusually accurate or unusually inaccurate. This is best expressed in numerical terms as the median value, and depicted in FIG. 15 as a range above the median line which represents the process error threshold.

In addition to the above aspects of the invention relating to determining the accuracy of the database overall, the present invention also uses neural network technology to find "duplicate data" (or incorrect, erroneous, inaccurate, whether intentionally or accidentally entered) in a computer system. A neural network pattern building system is used to build a pattern for each element or data entry in a computer system. These patterns that represent each entry are then reviewed to search for similar entries, i.e., similar patterns. The two steps that are necessary for this pattern building and pattern matching system are:

1) Building a pattern which facilitates usage on a neural network for each data entry; and
2) Comparing each of the pattern based entries with the other entries to find potential or actual duplicate or incorrect data.

The neural-based pattern of an entry is advantageously designed to have a fixed or standardized format so that all entries, regardless of size (i.e. number of alphanumeric characters) or type of data, appear as an identifiable pattern using the same format. This design will ensure that two entries that have similar letters but are of a different size, or two entries that are the same size but vary in, for example, a single letter, will both match when desired or configured as such.

An integral part of the neural network pattern matching system is the identification of the following problems that must be taken into consideration when using a neural network based pattern matching system. Simply using the letters that make up the neural-based pattern of an entry is not possible for two reasons which have been identified or discovered with respect to pattern matching techniques:

Neural networks do not accept anything but numbers (generally between 0 and 1) as entries;

Each entry would have a different size and could therefore not effectively be compared (a three-letter word would have a three-unit pattern and a five-letter word would have a five-letter pattern).

This patent proposes two methods for creating fixed-style patterns to numerically describe alphanumeric entries of any length.

The first pattern creates an array of slots for each character. Most business applications only require 128 slots to represent each of the letters on a typical keyboard, as illustrated in FIG. 18. However, an array representing each of the 256 displayable characters can be used as well if necessary. Further, any predefined character set may be used by this system, providing the user the flexibility to omit certain characters which have been determined to be of less importance or insignificant. Examples of predetermined character formats are presented below:

A pattern of an entry is made by reading the entry one character at a time, and incrementing the array slot that represents the character. For example, the entry "ABB100" has the slots representing the letters "A", and "1" incremented once, and the slots representing the letters "B" and "0" incremented twice. The pattern for this entry is illustrated in FIG. 19. Although this method suffices in creating a uniform pattern for any length entry, it has been discovered that one more process step makes this pattern more effective at matching random data entry errors.

The process step is as follows: Once the array is completed for an entry, each slot in the entry is then divided by the total number of characters in the entry. Using the above example of the entry "ABB100", the total number of characters in this entry is 6. Therefore, the slots in the array representing "AA" and "1" are incremented once and divided by 6, so that the final value in these slots is 0.1667. The slots representing the letters "B" and "0" are incremented twice and divided by 6, so the final value for these slots are 0.3333. This version of the pattern is illustrated in FIG. 20.

It has been discovered that additional variations of the above pattern may be necessary for pattern matching on upper and lower case character strings or on character strings which contain blanks. In particular, it has been discovered by observation that much data are improperly entered or submitted by virtue of the difference between upper and lower case characters or blank spaces. Oftentimes, it has been discovered that these different data items are treated as separate data entries even though the data are in fact duplicate or inaccurate.

Variations of the pattern described with reference to FIGS. 18–20 can be made by considering upper and lower case letters as the same, or by limiting the number of characters used for the array. In the first variation where upper and lower cases are considered the same the method will improve its matching capability in cases where entries are similar except for case, e.g., "MR SMITH" and "Mr. Smith".

The second variation where certain letters are ignored is useful in eliminating "noise", such as blanks. Some databases automatically pad data with blanks, so that "Mr. Smith" in the system appears as "Mr. Smith" (the empty spaces being blanks). When the pattern matching is done the two entries may not look that similar since one entry is excessively skewed with blanks. Not counting blanks, or other "noise" characters, can improve the matching rate in these circumstances.

Another pattern which may advantageously be used for pattern matching using a neural network or similar network, is to allocate an array of slots for each two-character combination of a data entry. Using only 26 characters in the alphabet and the 10 numeral characters, the array contains 36 to the power of 2 slots, as illustrated in FIG. 21. The first slot represents "AA", the second "AB", the third "AC", and so on.

The array of slots are filled much the same as with the first pattern method. As the entry is read the two-letter slots are filled. For example, the entry "ABB100" appears in the array as illustrated in FIG. 22. The slots filled in this case are: "AB", "BE", "B1", "10", and "00".

The benefit of using this pattern is that there is an inherent and built-in value for adjoining letters. Using the first neural-based pattern, the entry "ABB100" matches with 100% accuracy with the entry "001BBA". This may be useful in some applications. However, it has been discovered that sequence may be important. The second pattern is designed so that only two of the pairs, that is "BB" and "00", will match using this method, and therefore, there will be a low match value when comparing the entry "ABB100" with the entry "001BBA".

A variation of this pattern design discussed in connection with FIG. 22 is to use a three-letter combination for describing an alphanumeric sequence. With this variation an array of 36 to the power of 3 (46656) slots is created to describe each entry. The first slot in the array represents "AAA", the second "AAB", the third "AAC", and so on, as illustrated in FIG. 23. The entry "ABB100" is described in the array by incrementing the slots represented by "ABB", "BB1", "B10", and "100". The drawback to this method is that each entry must be described by a large array. The advantage is that character positioning is better emphasized in the match.

Figure 24A:
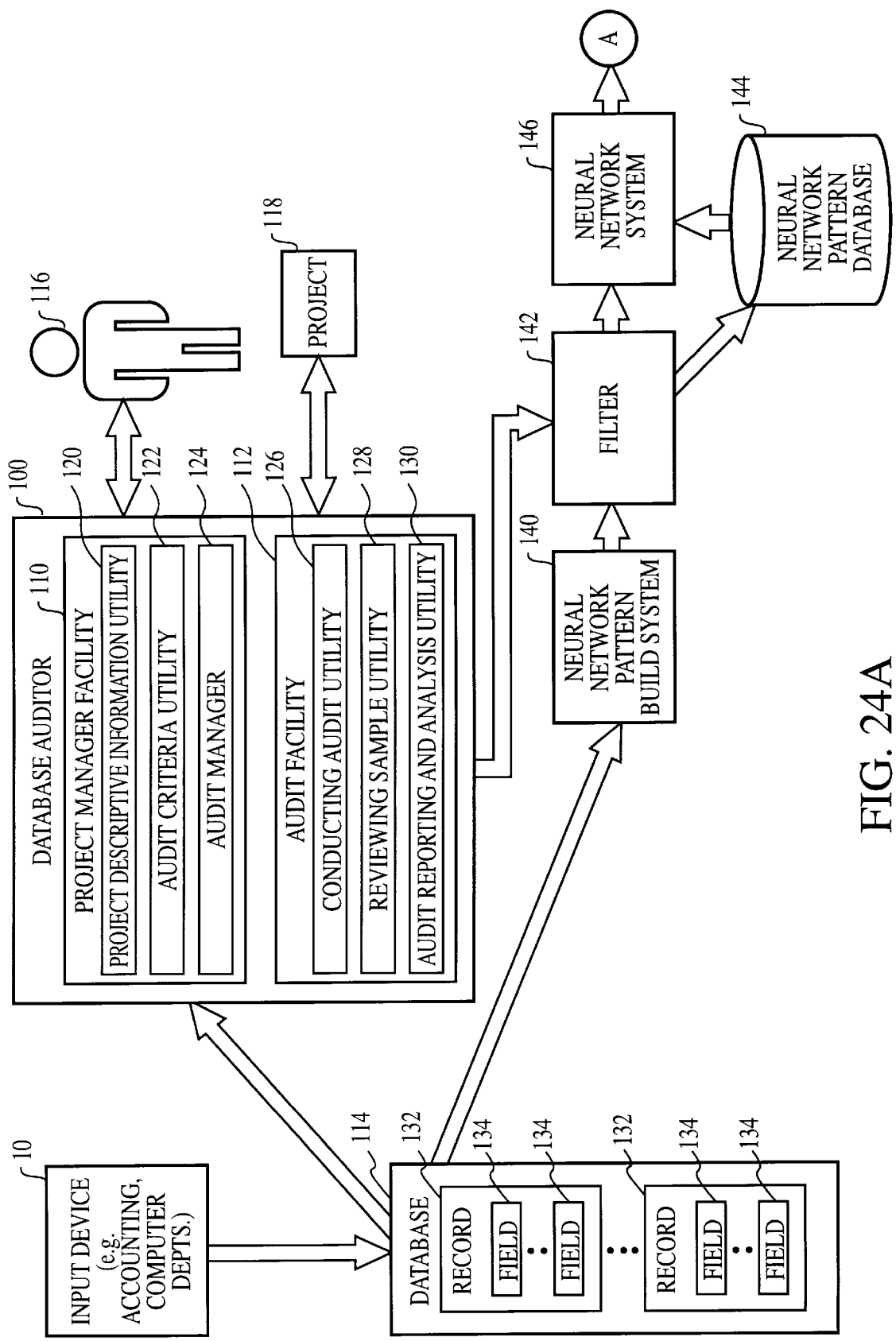
FIGS. 24a–24b are block diagrams illustrating the hardware configuration of the neural network pattern matching system.
Figure 24B:
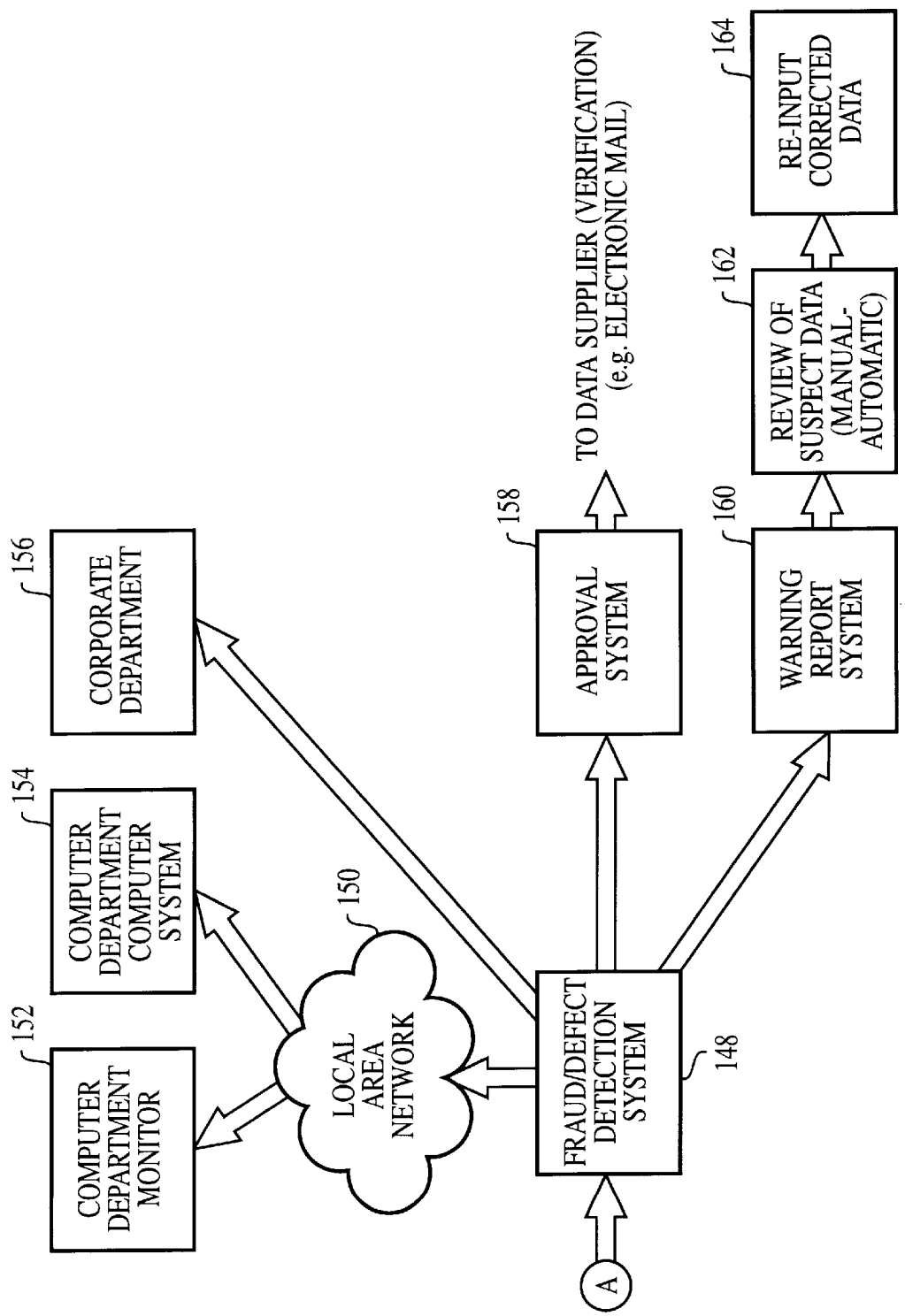

FIGS. 24a–24b are block diagrams illustrating the hardware configuration of the neural network pattern matching system. In FIGS. 24a–24b, a standard input device 10, such as a keyboard, voice recognition system or scanning system is provided which inputs information into database 114. Database 114 is then inspected or examined by database auditor 100 to determine the overall accuracy of the database. As described above in connection with FIG. 1, database auditor 100 comprises a project manager facility 110 and an audit facility 112. The project manager facility 110 provides tools to initiate, manage and analyze audits. The audit facility 112 provides tools to conduct individual audits and to analyze individual audit results. The database auditor 100 communicates with a database 114, a user 116 and one or more projects 118.

The project 118 is a convenient way to encapsulate statistical and user-defined criteria for conducting identical audits for a variety of databases 114 or for the same database 114 many times. Additionally, the project 118 is a management tool to organize and analyze a collection of audits. The database auditor 100 allows the user 116 to save, retrieve and delete projects 118. The project manager facility 110 comprises a project descriptive information utility 120, an audit criteria utility 122 and an audit manager 124. These modules will be described in detail below.

Whereas the project manager facility 110 is concerned with the administration of a collection of audits, the audit facility 112 provides the user 116 with the tools to manage and analyze a single audit. The objective of the audit facility 112 is to enable any user, regardless of their level of database audit experience, to properly conduct a database audit, and to arrive at correct accuracy results. The database auditor 100 places these results in a result file and inserts a pointer to the file in the corresponding project. The database auditor 100 also presents the results (on screen or on paper) to the user 116. In addition, database auditor 100 also transmits the results indicating the accuracy of the database to filter circuit 142.

The audit facility 112 comprises a conducting audit utility 126, a reviewing sample utility 128, and an audit reporting and analysis utility 130, as describe above. As described previously, database auditor 110 then analyzes the data stored in database 114 to determine the overall accuracy of the data contained therein. The results of the processes performed by database auditor 100 are then transmitted to filter 142. Neural network pattern built system 140 then retrieves data from database 114 and builds patterns for each of the data items which are to be examined as described above in connection with FIGS. 18–23. The built patterns are then input to filter 142 which may optionally be filtered and/or weighed responsive to the overall accuracy determined by database auditor 100. Filter 142 then selectively stores the various data patterns in neural network pattern database 144. Alternatively, the built neural network patterns may be transmitted directly to the neural network pattern database for later retrieval. Filter 142 may also optionally transmit the overall accuracy of the database to neural network system 146. Neural network system 146 selectively compares the data stored in the neural network pattern database 144, preferably using the neural network pattern matching techniques as will be described below. The results of the neural network pattern match process which are performed by the neural network system 146 are then transmitted to fraud/defect detection system 148 which, responsive to the data output by neural network system 146, determines whether potential, fraudulent or duplicate data are present in neural network pattern database 144. As will be described below in greater detail, the preferred format of the results of the neural network system is of the form of probable or potential pattern matches contained within neural network pattern database 144.

Fraud/defect detection system 148 then has various options depending on whether fraudulent or duplicate data have been detected. For example, fraud/defect detection system 148 may transmit the overall results of the pattern matching process to local area network 150 which then transmits the information to a computer department monitor 152 or a computer department system 154. The overall accuracy of the database as well as the specific data which may be potentially fraudulent or duplicative may then presented for viewing by the computer department and/or analysis via computer department computer system 154. In addition, fraud/defect detection system 148 may also transmit overall database accuracy and the specific items of data which are considered to be potentially fraudulent or duplicative to corporate department 156 which may then analyze the data to determine whether commonalities between the potentially fraudulent and duplicate data are consistent with the overall database accuracy determination, and whether commonalities between the fraudulent/duplicate data are present. For example, corporate department 156 may determine that fraudulent or duplicative data are being commonly entered by a single person which is entering the data via input device 10. In that situation, corrective steps can be taken to further train that individual to more properly input the data.

Additionally, if fraud/defect detection system 148 determines that no fraudulent or duplicate data are present, the results can then be transmitted to approval system 158 which may confirm that the data is acceptable for processing to the data supplier via, for example, electronic mail or other means.

Finally, if fraud/defect detection system 148 determines that in fact fraudulent or duplicate data may be present, the results may be transmitted to warning report system 160 which regenerates a report indicating the various duplicate or fraudulent data. The report may then be reviewed either manually or automatically at system 162 and if necessary, the data may then be corrected at system 164.

Note that the various processors or systems depicted in FIGS. 24a–24b represent a combination of specialized processors for performing specific tasks or functions. Alternatively, the various processors or systems described in connection with FIGS. 24a–24b may also be sub-routines of a large computer program. According to this alternative, a central processing unit would then implement or execute each of the different processing steps described below in order to implement the process of the neural network pattern matching system.

Figure 25A:
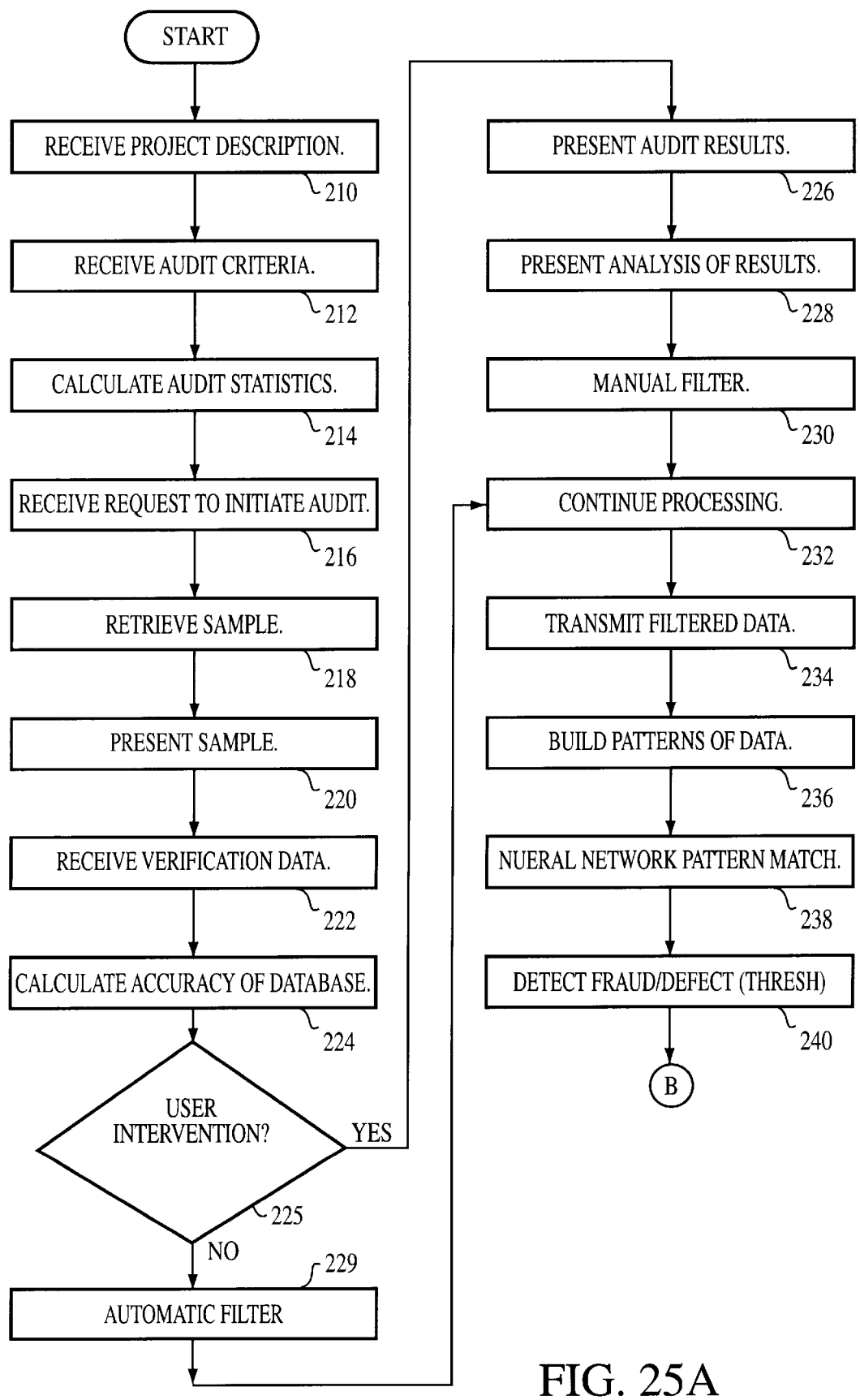
FIGS. 25a–25b are flow charts illustrating the process of the neural network pattern matching system.
Figure 25B:
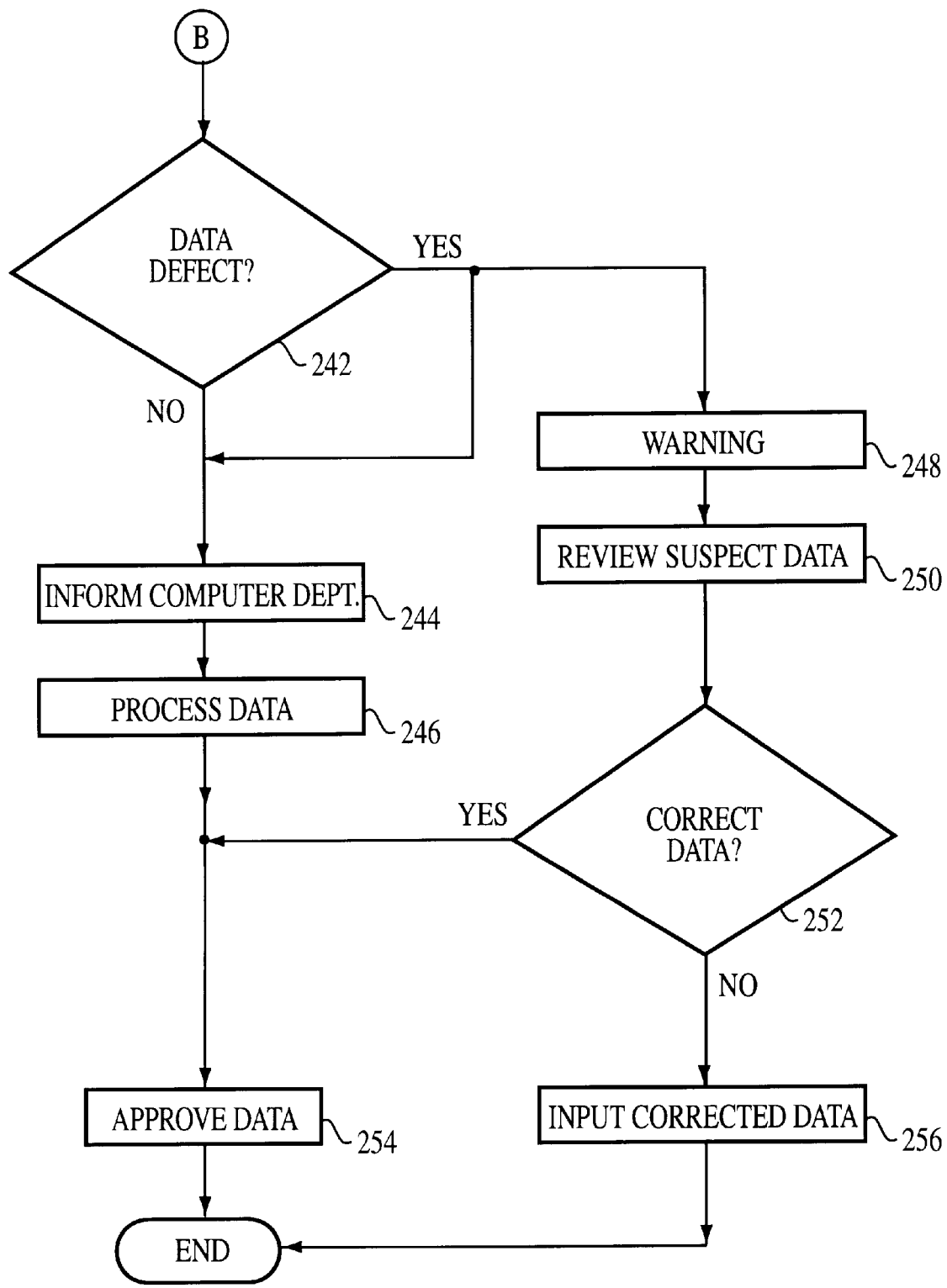

FIGS. 25a–25b are flow charts illustrating the process of the neural network pattern matching system. In steps 210–214, the project manager facility 110 defines a project 118. Specifically, in step 210, the project descriptive information utility 120 of the project manager facility 110 inserts descriptive information entered by the user 116 into the project 118. The project descriptive information utility 120 is described above in the section entitled "Descriptive Information". In step 212, the audit criteria utility 122 of the project manager facility 110 inserts audit criteria into the project 118. In step 214 the audit criteria utility 122 calculates the required sample size for the audit. The audit criteria utility 122 is described above in the section entitled "Audit Criteria".

Upon receiving a request to initiate an audit from the user 116 (in step 216), the audit facility 112 audits the database 114 in steps 216–224. To do so, the conducting audit utility 126 first retrieves (in step 218) the appropriate sample for the database 114 being audited. The method by which the conducting audit utility 126 carries out step 218 is described above in the section entitled "Sample Selection". Next, in step 220, the reviewing sample utility 128 presents the sample fields to the user 116. The reviewing sample utility 128 then receives (in step 224) verification data from the user 116 regarding the accuracy of the sample.

Once the accuracy of the database has been calculated by database auditor 100 in step 224, the user is then prompted whether manual intervention is requested (i.e., whether the user would like to manually review the database accuracy results). If the user requests manual intervention, the audit reporting and analysis utility 130 computes the accuracy of the sample, i.e., the results of the audit, in step 226. Step 226 is described in greater detail above in the section "Calculating Accuracies." The analysis of the results are then presented in step 228, and the user is prompted to determine whether the user would also like to manually filter database upon predetermined criteria in response to the results relating to the accuracy of the database. The process then continues at step 232.

If the user does not request manual intervention, the filter 142 optionally automatically filters data received from database 114 in step 229. The process then continues at step 232. The filter data is then transmitted in step 234 to neural network pattern build system 140 and neural network patterns are built in step 236 as described previously.

The neural network patterns are then stored in neural network pattern database 144, and a neural network pattern match is performed by neural network system 146 in step 238. Next, fraud/defect detection system 148 determines whether fraudulent or duplicative data are present, via for example, using a threshold value in step 240. If no duplicative or defective data are determined in step 242, fraud/defect detection system 148 informs the computer department in step 244, and the data is then processed in step 246 as discussed above, for example, in connection with approval system 158. If duplicative or defective data are in fact determined to be present in step 242, again the computer department is informed of this data. In addition, a warning process is implemented in step 248 by warning report system 160 and the suspect data are reviewed in step 250. If it is determined in step 252 that the correct data has been entered, the process then approves the data in step 254. If it is determined that the correct data is not present in step 252, the correct data may then be input in step 256.

Note that the steps of the database auditor 100 are presented in the order shown in FIGS. 25a–25b for clarity. The steps could be rearranged in various ways as well.

The specific types of pattern matching techniques implemented by neural network system 146 which have already been tested and shown to provide excellent results are the standard Kohonan and the Back Propagation neural networks, see, for example, U.S. Pat. Nos. 5,146,541 and 5,303,330, incorporated herein by reference. However, other pattern matching techniques could also be used, depending on the required application. In each type of comparison, a neural network is selected that is suitable to the requirements of the application. The Kohonan and Back Propagation networks are discussed below.

The Kohonan neural network is useful in grouping similar patterns. The primary benefit of the Kohonan neural net as the basis for finding duplicate information is that it does not require training. The neural network is built and the categories are created as the entries are provided to the Kohonan neural net. When a Kohonan neural network was used with the Neural Pattern described earlier in connection with FIG. 18, effective results are provided for small population sizes. FIG. 26 illustrates actual data that was grouped by this method, with the specified Kohonan network options.

In a Kohonan neural network each entry is fed into the network and a value is returned. By keeping track of the output numbers, entries with similar output numbers are grouped as similar. One disadvantage of the Kohonan neural network is that it may be moderately slow and is somewhat ineffective using large populations of entries. That is, as the number of entries in the system increases, its ability to effectively group similar data decreases.

The Back Propagation neural network is a trainable network. Using this method the entries are fed into the network in a first pass, which creates the neural pattern. Then a second pass is made with each entry to determine which values are to be compared. The second pass thereby indicates to what extent the current entry matches any of the entries in the population. There is a guarantee that the entry will at least match on itself within the population.

The Back Propagation network is created by creating an input/output array with as many slots as there are entries. For example, if there are 2000 entries in the population, then a 2000 slot input/output array is created. For each entry that is entered into the Back Propagation network, a second array is provided indicating which entry in the sequence it is. The first entry in the input/output array is indicated by setting the first slot to 1 and the remaining slots to 0. The second entry is indicated by setting the second slot to 1 and the remaining slots to 0, and so on.

When the entire Back Propagation network is trained with the entries, a second pass is made to evaluate each entry against the population. In the evaluation phase, each entry is passed through the network along with an empty input/output array. The Back Propagation network fills in the array with a value between 0 and 1 for each slot. A value of 1 indicates an exact match and a value of 0 indicates no match whatsoever. By scanning the input/output array for each entry in this manner, a table can be built of each entries comparative value with all the entries in the population. This is illustrated in FIG. 27. Any threshold can be set to consider a match relevant as potential duplicate or fraudulent data. For example, a 0.5 can be considered a relevant match. In this case if an entry matches any other with a value of 0.5 or greater, it is considered a potential duplicate.

The advantages of the Back Propagation network are that it provides a relative ranking of entries and their matches with other entries in a population, and that it can easily be extended to other types of comparison-related applications. As compared with the Kohonan, this neural net method provides a value that indicates the extent one entry matches another. This can be used to provide different thresholds for indicating a match. This method can also be used for a wide variety of comparison-related problems. In cases where a match on similar values is required without necessarily grouping items, this method can be used as opposed to the Kohonan. For example, in many companies there is a need to find employees that are acting as vendors to the company, since this is likely a conflict and may potentially be the basis of fraud. However, the name, address, social security number or other information of how the employee is registered as a vendor will likely be varied from the way the employee is registered as an employee (e.g., in the human resource system). To find such conflicts a Back Propagation network can be built using the entries of the human resource system, i.e., the employee database. Then, each entry of the vendor database can be used to find whether there is a relative match in the employee database. Since the entries are translated into one of the neural-based patterns, the Binomial neural network will identify similar entries and match on employees that have slightly altered their identification as vendors in the vendor system.

Kohonan and Back Propagation Neural Networks are standard and may be implemeted by, for example, NEUROWINDOWS: Nueral Network Dynamic Link Library, manufactured by Ward Systems Group, Inc., the manual of which is incorporated herein by reference. Similar networks are also disclosed, for example, in Caudill, M., The Kohonan Model, Neural Network Primer, AI Expert, 1990, 25–31; Simpson, P., Artificial Neural Systems, New York, N.Y., Pergamon Press, 1990; Wasserman, P., Neural Computing Theory and Practice, New York, N.Y., Van Nostrand Reinhold, 1989; Specht D. and Shapiro, P., Generalization Accuracy of Probalisitic Neural Networks Compared With Back-Propagation Networks, Proceedings of the International Joint Conference on Neural Networks, Jul. 8–12, 1991, 1, 887–892, all of which are incorporated herein by reference.

Figure 28A:
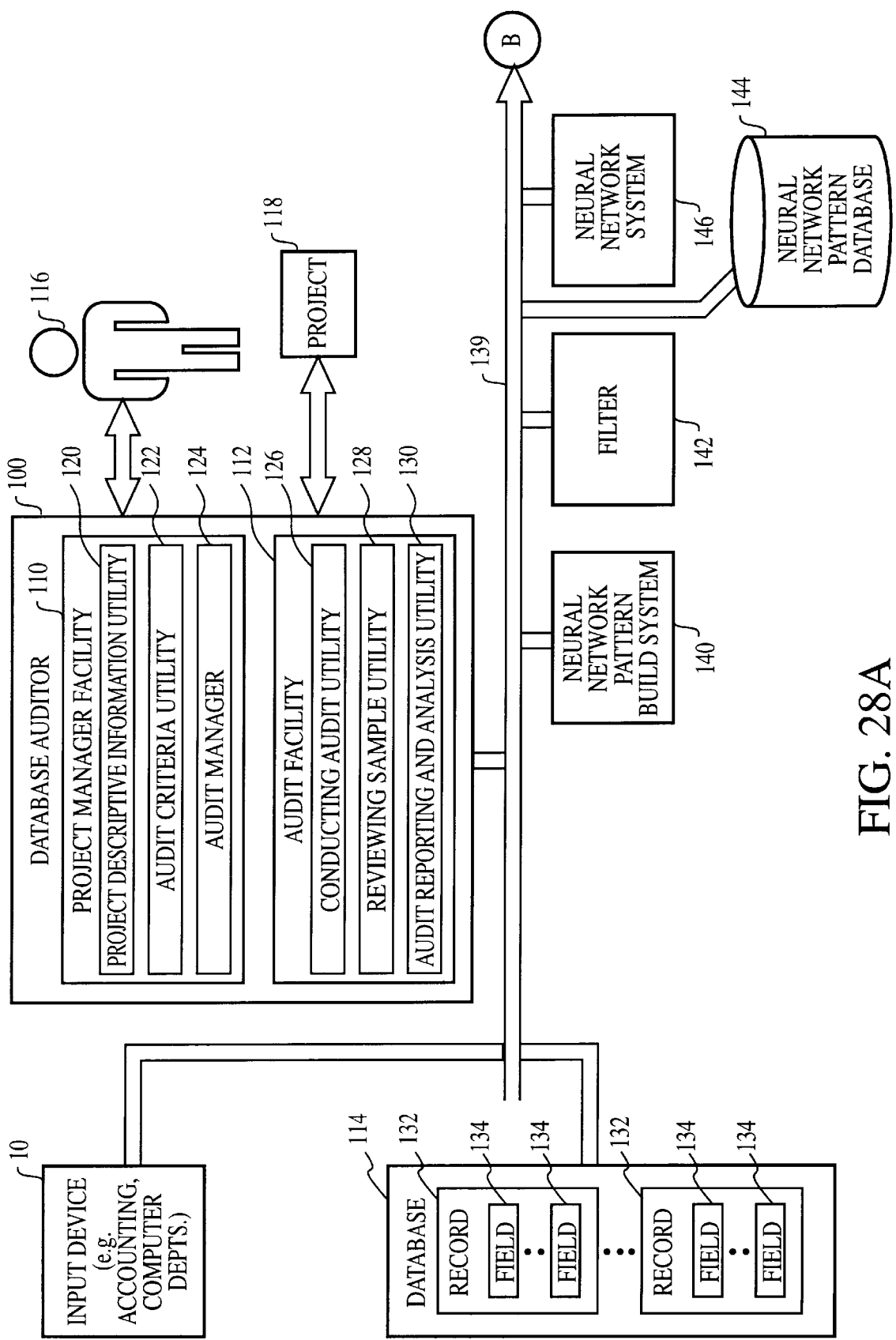
FIGS. 28a–28b are block diagrams illustrating another embodiment of the pattern matching system.
Figure 28B:
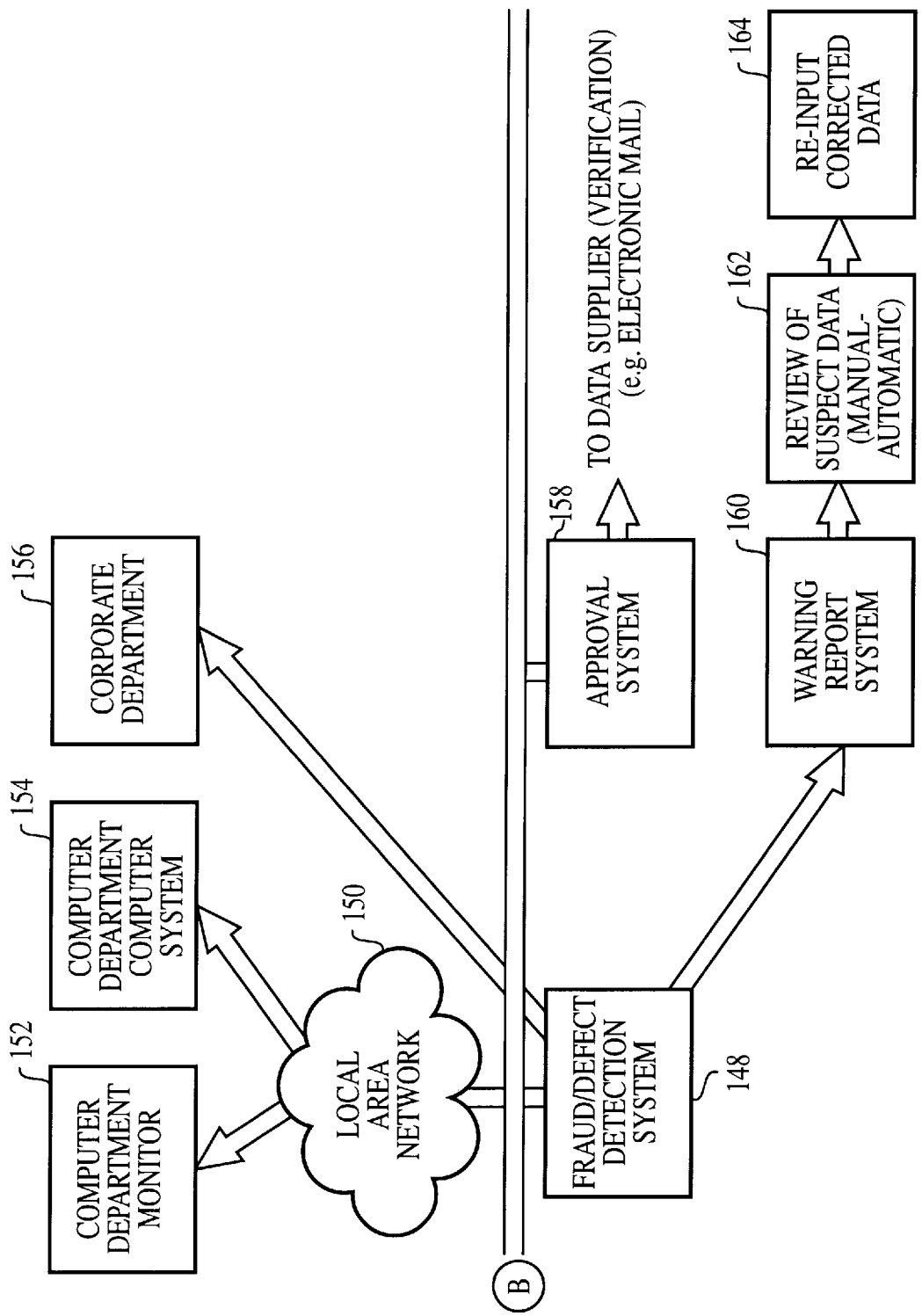

FIGS. 28a–28b are block diagrams illustrating another embodiment of the pattern matching system. In this embodiment, the hardware configuration is arranged according to the multiple instruction multiple data (MIMD) multiprocessor format for additional computing efficiency. The details of this form of computer architecture are disclosed in greater detail in, for example, U.S. Pat. No. 5,163,131, Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference. FIGS. 28a–28b are similar to FIGS. 24a–24b with the exception of more clearly defining the MIMD computer architecture via data bus 139. This MIMD architecture provides unique advantages, such as computing efficiency and better data maintenance, which are described more fully in the above references relating thereto.

By creating a neural network-based pattern for each entry in the computer system, the data can be compared using various pattern matching techniques that solves the limitation of conventional algorithmic-based comparisons. Instead of looking for duplicates where the data begins with the same sequence of alphanumeric characters, the neural-based pattern of one entry is used to compare with the neural-based pattern of the remaining entries in the system. Since neural networks are non-algorithmic, it has been discovered that a similar pattern will match regardless of what type of error occurs and where within the entry the error occurs.

It should be noted that while the above process was described with reference to FIGS. 25a–25b, in essence, the various steps of the present invention are performed in hardware. Accordingly, each step of the present invention typically generates a physical electrical signal which represents a physical result of a specific step described in the flow charts. The flow charts represent physical electrical signals which are generated and used in subsequent steps of the process. Therefore, the flow charts represent the transforming of physical electrical signals representing physical characteristics and quantities into other physical electrical signals also representing transformed physical characteristics.

In summary, using a neural-network to find "eduplicate data" eliminates the above described deficiencies with the conventional system. Creating a neural network-based pattern of data is a generic method that can be applied to any system storing data.

Therefore, the neural network pattern matching system described herein may be used to find "duplicate data" for any type of system and for any type of data. In addition, since neural networks are not algorithmic-based, the neural-based pattern of one entry will match on the neural-based pattern of another entry regardless of which of the four types of data entry errors. Exact duplicates will also match, as with the conventional system.

Neural networks provide an effective means of identifying similar information in a repository of data. In today's business world where most decisions are made based on the data in computer systems, knowing that information is similar or unique can be advantageous or even necessary. The methods described above provide the means for identifying similar such as duplicative or fraudulent information in a repository of data.

While various embodiments of the present invention have been described above, it should be understood that they have been presented by way of example only. Thus, the breadth and scope of the present invention should not be limited by any of the above-described exemplary embodiments, but should be defined only in accordance with the following claims and their equivalents.

What is claimed is:

1. A data comparison system for comparing data stored within a database against each other to determine at least one of duplicate, fraudulent, defective and irregular data, said data comparison system comprising:

a database storing data therein;

a pattern database storing pattern data therein;

a data pattern build system, responsively connected to said database and to said pattern database, retrieving the data from said database and generating the pattern data formatted in accordance a predetermined patten, the predetermined pattern comprising an array having array locations corresponding to each character in a defined character set, said data pattern build system incrementing a value in each of the array locations responsive to the number of occurrences of each character in the data and storing the array as the pattern data in said pattern database; and a neural network, responsively connected to said pattern database, retrieving the pattern data stored therein and comparing the pattern data to each other and determining responsive to the comparing when different pattern data match in accordance with predetermined criteria indicating that the different pattern data are at least one of duplicate, fraudulent, defective and irregular.

2. A data comparison system according to claim 1, wherein said data pattern build system normalizes the value in each of the array locations with respect to a total number of characters in the data producing a normalized array for each data, and stores the normalized array as the pattern data in said pattern database.

3. A data comparison system according to claim 1, wherein said neural network determines that when the different pattern data match responsive to a threshold value indicating that the different pattern data are at least one of duplicate, fraudulent, defective and irregular.

4. A data comparison system according to claim 1, wherein said neural network determines that when the different pattern data match irrespective of whether the different pattern data include upper and lower case characters or empty spaces.

5. A data comparison system according to claim 1, wherein said neural network comprises one of a Kohonan neural network and a Back Propagation neural network.

6. A data comparison system according to claim 1, wherein said data pattern build system generates the pattern data formatted in accordance a second predetermined patten, the second predetermined pattern comprising the array having the array locations corresponding to pairs of characters in the defined character set, said data pattern build system incrementing the value in each of the array locations responsive to the number of occurrences of each of the pairs of the characters.

7. A data comparison system according to claim 6, wherein an array number representing the number of array locations comprises the number of characters in the defined character set to the power of 2.

8. A data comparison system according to claim 6, wherein the pairs of characters comprise adjacent pairs of characters.

9. A data comparison system according to claim 1, wherein said data pattern build system generates the pattern data formatted in accordance a second predetermined patten, the second predetermined pattern comprising the array having the array locations corresponding to three character combinations in the defined character set, said data pattern build system incrementing the value in each of the array locations responsive to the number of occurrences of each of the three character combinations.

10. A data comparison system according to claim 9, wherein an array number representing the number of array locations comprises the number of characters in the defined character set to the power of 3.

11. A data comparison system according to claim 1, further comprising defective/duplicative data detection means for determining when the different pattern data are at least one of duplicate, fraudulent, defective and irregular, and for at least one of:

displaying whether the different pattern data are at least one of duplicate, fraudulent, defective and irregular;

generating a report confirming that the different pattern data are valid and for processing the validated pattern data in accordance with a predetermined set of processing instructions;

generating a warning report indicating that the different pattern data are potentially at least one of duplicate, fraudulent, defective and irregular; and generating an electronic mail message reporting to a data originator of the data represented by the different pattern data indicating whether the different pattern data are at least one of duplicate, fraudulent, defective and irregular.

12. In a data comparison system for comparing data stored within a repository against each other to determine at least one of duplicate, fraudulent, defective and irregular data, the data comparison system comprising a database storing data therein, a pattern database storing pattern data therein, a data pattern build system and a neural network, a method of comparing the data stored within the database against each other to determine at least one of duplicate, fraudulent, defective and irregular data, said method comprising the steps of:

(a) retrieving the data from the database;

(b) generating pattern data formatted in accordance a predetermined pattern from the data, the predetermined pattern comprising an array having array locations corresponding to each character in a defined character set, said generating the pattern data comprising the step of incrementing a value in each of the array locations responsive to the number of occurrences of each character in the data;

(d) storing the array as the pattern data; and (e) retrieving the pattern data and comparing the pattern data to each other; and (f) determining responsive to said comparing when different pattern data match in accordance with predetermined criteria indicating that the different pattern data are at least one of duplicate, fraudulent, defective and irregular.

13. A computer based system for examining data stored electronically in a database of a computer, wherein the database stores records each having a one or more fields, comprising:

accessing means for accessing criteria stored in the computer, wherein the criteria includes the number of items stored in the database to be examined;

sample generation means for generating a sample set of data based on the criteria, such that said sample set of data includes at least the number of items to be examined in accordance with the criteria, wherein said sample set of data is selected by applying at least one of a focus group criteria, a filter criteria, a skew criteria, or an empty field indicator, wherein said sample generation means includes at least one of focus group means, responsive to said focus group criteria, for logically organizing a variety of fields within the database whose combined accuracy are analyzed as one unit, filter means, responsive to said filter criteria, for determining records and fields for inclusion in said sample set, empty field means, responsive to said empty field indicator, for not including empty fields in said sample set when said sample set is generated, and skew means, responsive to said skew criteria, for emphasizing one or more fields within a record such that said sample set is biased towards said emphasized one or more fields, but does not limit said sample set to only emphasized fields; and analysis means for accepting said errors, and determining results, said results indicating approximate accuracy values of said the records stored in said database.

14. A computer based system according to claim 13, further comprising:

a pattern database storing pattern data therein;

a data pattern build system, responsively connected to said database and to said pattern database, retrieving the data from said database and generating the pattern data formatted in accordance a predetermined patten, the predetermined pattern comprising an array having array locations; and a neural network, responsively connected to said pattern database, retrieving the pattern data stored therein and comparing the pattern data to each other and determining when different pattern data match in accordance with predetermined criteria indicating that the different pattern data are at least one of duplicate, fraudulent, defective and irregular.

15. A computer based system according to claim 14, wherein said data pattern build system receives said results from said analysis means and filters the records stored in said database prior to building the pattern data responsive to said results.

16. A computer based system according to claim 14,
wherein said neural network generates a match result signal indicating whether the different pattern data are at least one of duplicate, fraudulent, defective and irregular, and wherein said analysis means receives the match result from said neural network and simultaneously indicates the approximate accuracy values of said the records stored in said database and the different pattern data which match.

* * * * *